(12) United States Patent
Yajima et al.

(10) Patent No.: US 6,674,186 B2
(45) Date of Patent: Jan. 6, 2004

(54) LINEAR MOTOR

(75) Inventors: Hisashi Yajima, Tsukuba-gun (JP); Kazuya Tamura, Soka (JP); Nobuhiro Fujiwara, Moriya (JP); Hiroyuki Wakiwaka, Nagano (JP); Norhisam Misron, Nagano (JP)

(73) Assignee: SMC Kabushiki Kaisha, Tokyo (JP)

( * ) Notice: Subject to any disclaimer, the term of this patent is extended or adjusted under 35 U.S.C. 154(b) by 37 days.

(21) Appl. No.: 10/140,825

(22) Filed: May 9, 2002

(65) Prior Publication Data

US 2002/0167230 A1 Nov. 14, 2002

(30) Foreign Application Priority Data

May 10, 2001 (JP) ........................................ 2001-140605

(51) Int. Cl.[7] .............................................. H02K 41/00
(52) U.S. Cl. .......................................... 310/12; 310/13
(58) Field of Search ............ 310/12, 13, 156.01–156.884

(56) References Cited

U.S. PATENT DOCUMENTS

| | | | | |
|---|---|---|---|---|
| 4,638,192 A | * | 1/1987 | von der Heide | 310/12 |
| 4,908,533 A | * | 3/1990 | Karita et al. | 310/12 |
| 5,218,250 A | * | 6/1993 | Nakagawa | 310/12 |
| 5,723,917 A | * | 3/1998 | Chitayat | 310/12 |
| 5,854,521 A | * | 12/1998 | Nolle | 310/12 |

FOREIGN PATENT DOCUMENTS

| | | |
|---|---|---|
| JP | 63-29452 | 11/1988 |
| JP | 64-047258 | 2/1989 |
| JP | 01-298945 | 12/1989 |
| JP | 02-032750 | 2/1990 |
| JP | 02-114852 | 4/1990 |
| JP | 02-307356 | 12/1990 |
| JP | 06-197517 | 7/1994 |
| JP | 07-170719 | 7/1995 |
| JP | 07-288969 | 10/1995 |
| JP | 08-009623 | 1/1996 |
| JP | 08-163857 | 6/1996 |
| JP | 10-327571 | 12/1998 |
| JP | 11-041905 | 2/1999 |

* cited by examiner

*Primary Examiner*—Dang Le
(74) *Attorney, Agent, or Firm*—Paul A. Guss

(57) ABSTRACT

A plurality of permanent magnets are embedded at predetermined pitches $\tau p$ in a longitudinal direction in a field yoke composed of a magnetic substance so that adjacent magnet poles have opposite polarity, and a plurality of electromagnets, which have magnetic pole pitches $\tau e \approx (2n+1)\tau p$ of preset intervals provided that n is 0, 1, 2, ..., which are disposed at predetermined pitches $\tau g = (2s+1/m)\tau e$ in the longitudinal direction of the field yoke provided that m is a number of exciting phase and s is 1, 2, 3, ..., and which are separated from the field yoke by a predetermined gap while opposing to the field yoke, are provided. The field yoke is driven by successively exciting the electromagnets.

4 Claims, 24 Drawing Sheets

LINEAR MOTOR

BACKGROUND OF THE INVENTION

1. Field of the Invention

The present invention relates to a linear motor comprising permanent magnets embedded in a field magnet yoke.

2. Description of the Related Art

A variety of linear motors or pulse motors, which are provided with permanent magnets, have been suggested. Taking notice of the method for providing the permanent magnets, the following linear motors or pulse motors are representatives.

A variable reluctance type linear pulse motor comprises a permanent magnet joined to an iron core, the permanent magnet being disposed near an upper portion of the iron core provided with an exciting coil, and a magnetic pole plate for interposing the permanent magnet together with the iron core (see Japanese Laid-Open Patent Publication No. 63-294252). Another variable reluctance type linear pulse motor comprises permanent magnets which are arranged in a divided manner (see Japanese Laid-Open Patent Publication Nos. 2-307356 and 2-32750).

However, in the linear pulse motor disclosed in any one of Japanese Laid-Open Patent Publication Nos. 63-294252, 2-307356, and 2-32750, the iron core cannot be miniaturized because the permanent magnet is provided on the upper excitation side.

A linear pulse motor comprises first and second rotors or reaction plates which are arranged on both upper and lower surfaces of a stator and which are mechanically fixed respectively, each of the first and second rotors being formed with a U-shaped core, the core being divided into two to arrange a permanent magnet therebetween so that the magnetic flux flows from one to the other, and the core being applied with an exciting wiring wound therearound (Japanese Laid-Open Patent Publication No. 64-47258).

However, in the linear pulse motor disclosed in Japanese Laid-Open Patent Publication No. 64-47258, the permanent magnet is provided on the field yoke, and it is impossible to miniaturize the field yoke.

A linear pulse motor comprises a permanent magnet which is provided for iron core teeth disposed on the excitation side of a rotor, and a slit which is provided for a non-magnetized portion. The linear pulse motor comprises a permanent magnet which is provided for iron core teeth of a stator, and a slit plate which has a slit at a non-magnetized portion (Japanese Laid-Open Patent Publication No. 1-298945).

However, in the linear pulse motor disclosed in Japanese Laid-Open Patent Publication No. 1-298945, the iron core including the slit plate cannot be miniaturized.

A linear pulse motor comprises, at a forward end of a magnetic pole for constructing an electromagnet of a rotor, a permanent magnet which generates a magnetomotive force in a direction perpendicular to a direction of a magnetomotive force generated by the electromagnet, or a permanent magnet which generates a magnetomotive force in a direction parallel to the direction of the magnetomotive force generated by the electromagnet (Japanese Laid-Open Patent Publication No. 2-114852).

However, in the linear pulse motor disclosed in Japanese Laid-Open Patent Publication No. 2-114852, the electromagnet cannot be miniaturized because the permanent magnet is provided at the forward end of the magnetic pole.

A linear pulse motor comprises magnetic pole blocks arranged with small teeth disposed on outer circumference in an axial direction, permanent magnets for magnetizing the magnetic pole blocks to give predetermined magnetic poles, and the magnetic pole blocks being magnetized to have mutually different magnetisms by the permanent magnets, in which tips of the teeth of one magnetic pole block are opposed to tips of teeth of a protruding magnetic pole of a stator, while tips of the other magnetic pole block are opposed to bottoms of teeth of the protruding magnetic pole of the stator (Japanese Laid-Open Patent Publication No. 6-197517).

However, in the linear pulse motor disclosed in Japanese Laid-Open Patent Publication No. 6-197517, the linear pulse motor cannot be miniaturized because of the presence of the magnetic pole block.

A linear pulse motor comprises a rotor having a rotor iron core formed with a plurality of small rotor teeth disposed at equal pitches in an axial direction while opposing to small stator teeth on an outer circumferential surface, in which a cylindrical member composed of a non-magnetic material is provided between a shaft of the rotor and the iron core of the rotor (Japanese Laid-Open Patent Publication Nos. 7-170719 and 8-9623).

However, in the linear pulse motor disclosed in Japanese Laid-Open Patent Publication Nos. 7-170719 and 8-9623, the linear pulse motor cannot be miniaturized because the cylindrical member is disposed between the shaft of the rotor and the iron core of the rotor.

A linear pulse motor comprises a permanent magnet for magnetizing rotor iron cores spaced from each other by predetermined axial distances into N magnetic poles and S magnetic poles respectively, in which a rotor shaft is composed of a magnetic material or a non-magnetic material, the permanent magnet is cylindrical, and the permanent magnet is arranged between the rotor iron core and the rotor shaft (Japanese Laid-Open Patent Publication No. 7-288969).

However, in the linear pulse motor disclosed in Japanese Laid-Open Patent Publication No. 7-288969, the linear pulse motor cannot be miniaturized because of the presence of the permanent magnet.

A linear pulse motor comprises permanent magnets magnetized in an axial direction, the permanent magnets being interposed between rotor cores spaced from each other by predetermined axial distances (Japanese Laid-Open Patent Publication No. 8-163857).

However, in the linear pulse motor disclosed in Japanese Laid-Open Patent Publication No. 8-163857, the linear pulse motor cannot be miniaturized because of the presence of the permanent magnet.

A linear pulse motor comprises magnetic pole units as rotors which include teeth composed of permanent magnets and magnetic substances arranged alternately at predetermined pitches and which are provided and separated by a predetermined gap with respect to a plurality of exciting units arranged at spacing distances of ⅛ pitch to function as stators, one of the exciting units including magnetic poles arranged to intervene the magnetic pole unit on both sides, a magnetic substance for connecting the magnetic poles, and an armature coil wound around the magnetic substance (Japanese Laid-Open Patent Publication No. 10-327571).

However, in the linear pulse motor disclosed in Japanese Laid-Open Patent Publication No. 10-327571, the linear pulse motor cannot be miniaturized because of the presence of the permanent magnet.

A linear pulse motor comprises a permanent magnet arranged in a rotor having a plurality of small rotor teeth, in which the small rotor teeth are arranged at spacing distances of ½ of pitches of small stator teeth to constitute pairs of rotor cores with the permanent magnet magnetized in an axial direction between one small tooth and another small tooth, and the pairs are electrically insulated from each other by a gap or a non-magnetic substance (Japanese Laid-Open Patent Publication No. 11-41905).

However, in the linear pulse motor disclosed in Japanese Laid-Open Patent Publication No. 11-41905, the rotor cannot be miniaturized.

Further, the linear pulse motor using the permanent magnet as described above has no sufficient thrust force, in addition to the difficulty of miniaturization.

SUMMARY OF THE INVENTION

A general object of the present invention is to provide a linear motor which has a simple structure, which can be miniaturized, and which has a sufficient thrust force.

According to the present invention, there is provided a linear motor in which a thrust force is generated between a field yoke and electromagnets by an attraction and a repulsion based on polarities brought about for magnetic poles of permanent magnets embedded at predetermined pitches in the field yoke, magnetic poles formed on field yoke portions between the permanent magnets, and magnetic poles formed on the electromagnets by means of magnetization, and thus one of the field yoke and any unit including the electromagnets is relatively driven.

In the linear motor according to the present invention, the following relationships are established:

$$\tau e \approx (2n+1)\tau p$$

$$\tau g = (2s+1/m)\tau e$$

wherein τp represents the spacing distance of the pitch of the permanent magnets embedded in the field yoke, τe represents the magnetic pole pitch of the electromagnets, τg represents the spacing distance of the pitch of the electromagnets, m represents the number of exciting phase or phases, n is 0, 1, 2, 3, . . . , and s is 1, 2, 3, . . . .

According to the linear motor of the present invention, the permanent magnets are embedded at the pitches τp≈τe/(2n+1) in the field yoke, and the electromagnets are formed at the positions of the pitches τg, i.e., τg=(2s+1/m)τe. In the linear motor, the field yoke or the electromagnets are driven in one direction at the step width τe/m.

According to the linear motor of the present invention, when the electric power is applied to a coil wound around a yoke portion for connecting respective legs, the respective legs can be magnetized to have opposite magnetic polarity.

The linear motor of the present invention also has the following feature. That is, a core of the electromagnet has two legs which are connected by a yoke for generating magnetic poles having opposite magnetic polarity, a wire is wound around the respective legs in opposite directions to form a differential coil thereby, and the respective legs are magnetized to have the opposite magnetic polarity by applying electric power to the differential coil.

According to the linear motor of the present invention, the respective legs can be magnetized to have the opposite magnetic polarity by applying the electric power to the differential coil.

According to the linear motor of the present invention, respective legs, which are disposed at both outer positions of the electromagnet, can be magnetized to have opposite magnetic polarity by applying electric power to a coil wound around a central leg of the three legs.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

An embodiment of a linear motor according to the present invention will be explained.

Figure 1:
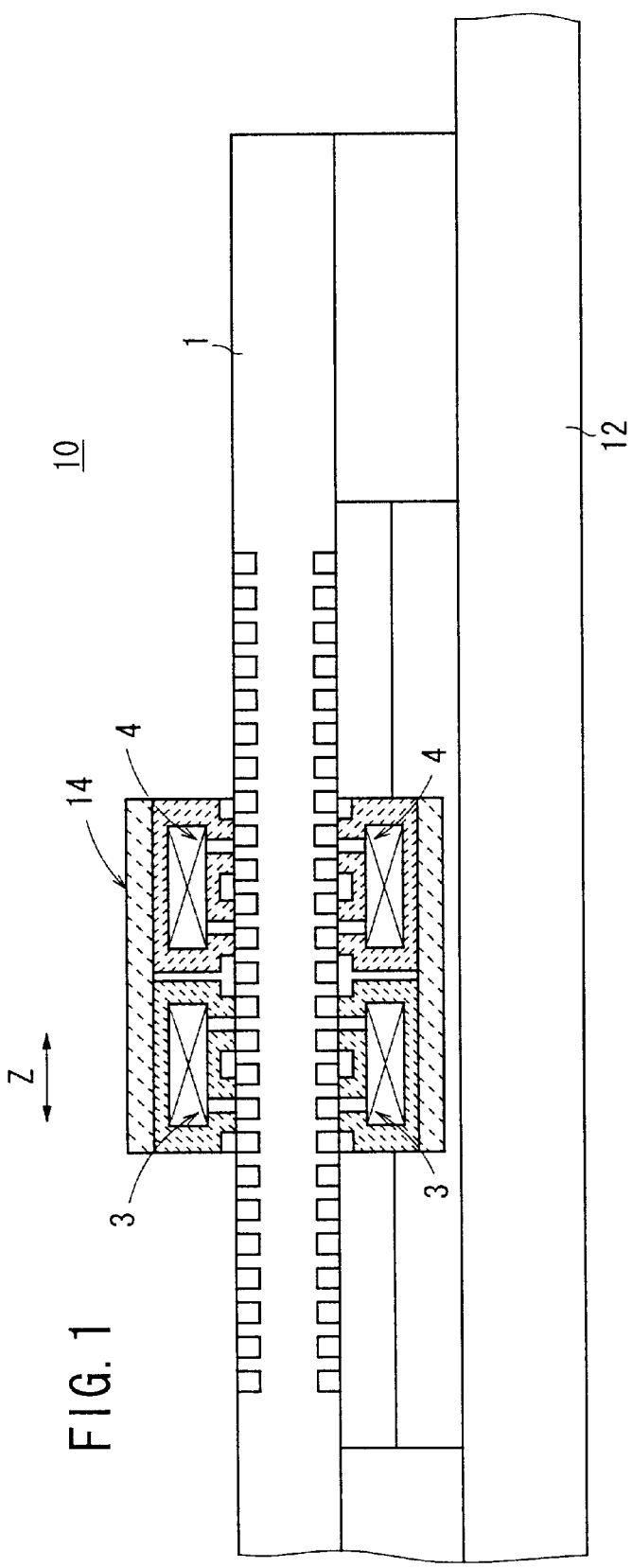
FIG. 1 shows an arrangement of a linear motor according to an embodiment of the present invention.

FIG. 1 shows an arrangement of the linear motor 10 according to the embodiment of the present invention.

The linear motor 10 has a stator block 14 which is fixed on a base 12, and a field yoke 1 which penetrates through the stator block 14 and which is provided displaceably in the direction of the arrow Z under the guiding action of an unillustrated guide.

FIGS. 2A to 2C and FIGS. 3A, 3B schematically show the arrangement of the linear motor 10 according to the embodiment of the present invention.

The field yoke 1 is composed of, for example, a laminated core or a laminated silicon steel plate as a magnetic material. Annular permanent magnets 2-0, 2-1, 2-2, . . . , 2-n are embedded in the field yoke 1 at preset constant spacing distances, for example, at pitches $\tau p$ so that the permanent magnets 2-0, 2-1, 2-2, . . . , 2-n form an identical surface together with the surface of the field yoke 1. The permanent magnet 2-(n−1) and the permanent magnet 2-n, which are adjacent to one another, are magnetized in mutually opposite polarity, for example, to give NS, SN, NS, SN and so forth. Therefore, the S magnetic poles and the N magnetic poles are alternately generated on projections of the field yoke 1 disposed between the permanent magnets.

The linear motor 10 has an electromagnet 3 comprising an electromagnet core 3-1 composed of a laminated silicon steel plate having a U-shaped cross section which is open on the side of the field yoke 1 with a gap of predetermined spacing distance opposed to the field yoke 1 and a coil 3-2 wound around the electromagnet core 3-1, and an electromagnet 4 comprising an electromagnet core 4-1 composed of a laminated silicon steel plate having a U-shaped cross section which is open on the side of the field yoke 1 with a gap of predetermined spacing distance opposed to the field yoke 1 and a coil 4-2 wound around the electromagnet core 4-1.

With reference to FIGS. 2A to 2C and FIGS. 3A, 3B, two exciting phases are provided to exemplarily illustrate a case of the one-phase excitation. In the following description, the electromagnet 3 will be also referred to as "exciting phase A", and the electromagnet 4 will be also referred to as "exciting phase B".

Figure 4:
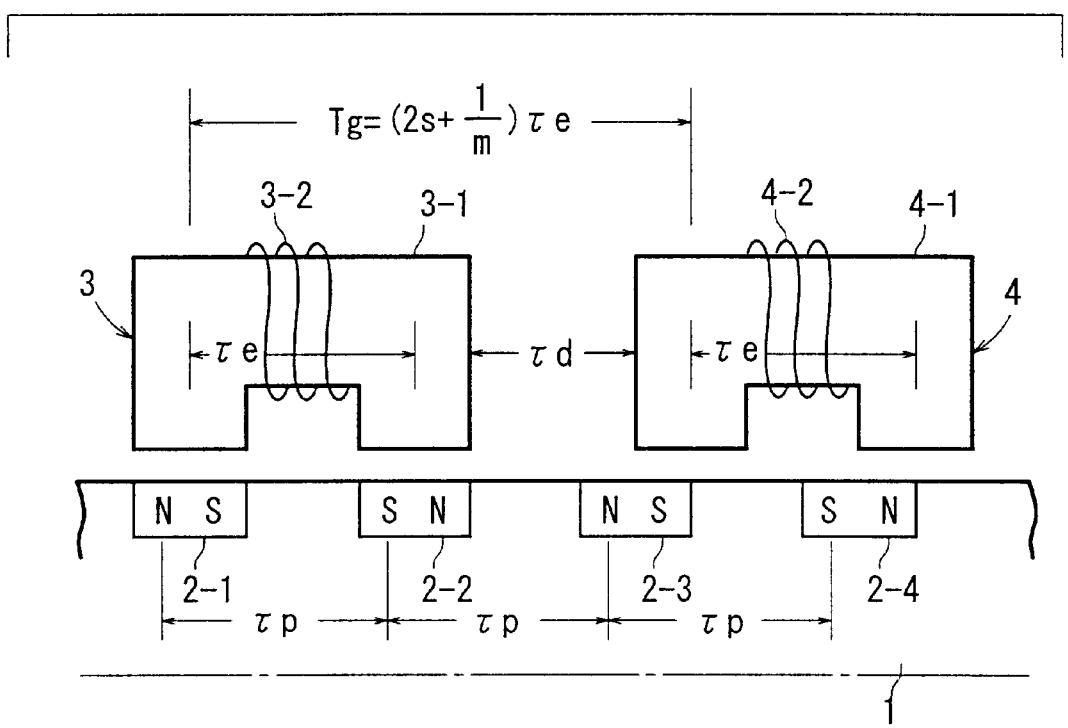
FIG. 4 schematically illustrates the mutual positional relationship of permanent magnets and the positional relationship of electromagnets in the linear motor according to the embodiment of the present invention.

As shown in FIG. 4, the pitches of the permanent magnets 2-0, 2-1, 2-2, . . . embedded in the field yoke 1 are set to $\tau p$. The pitch between legs of the electromagnet core 3-1, i.e., the magnetic pole pitch as the distance between central positions of the magnetic poles generated on the legs of the electromagnet core 3-1 by the magnetization brought about by exciting the electromagnet 3, and the pitch between legs of the electromagnet core 4-1, i.e., the magnetic pole pitch as the distance between central positions of the magnetic poles generated on the legs of the electromagnet core 4-1 by the magnetization brought about by exciting the electromagnet 4 are set to $\tau e$. The following relationship is given between the magnetic pole pitch τe and the pitch τp between the permanent magnets.

$$\tau e \approx (2n+1)\tau p \qquad (1)$$

In the expression, n=0, 1, 2, 3, . . . is affirmed. The expression with ≈ also considers the occurrence of such a case that some deviation may be made in order to suppress the fluctuation of the thrust force.

By contrast, the pitch τg between the electromagnet 3 and the electromagnet 4 is set as follows.

$$\tau g = (2s + 1/m)\tau e \qquad (2)$$

In the expression, s=1, 2, 3, . . . is affirmed, and m represents the number of exciting phase or phases.

The spacing distance τd between the electromagnet 3 and the adjacent electromagnet 4 is as follows provided that the width of the leg of the electromagnet core is τe/m. That is, τd=τe is given when the number of phases m is 2, τd=2τe/3 is given when the number of phases m is 3, and τd=2τe/5 is given when the number of phases m is 5.

The spacing distance τd between the electromagnet 3 and the adjacent electromagnet 4 is as follows provided that the width of the leg of the electromagnet core is τe/2. That is, τd=τe is given when the number of phases m is 2, τd=5τe/6 is given when the number of phases m is 3, and τd=7τe/10 is given when the number of phases m is 5.

Figure 2A:
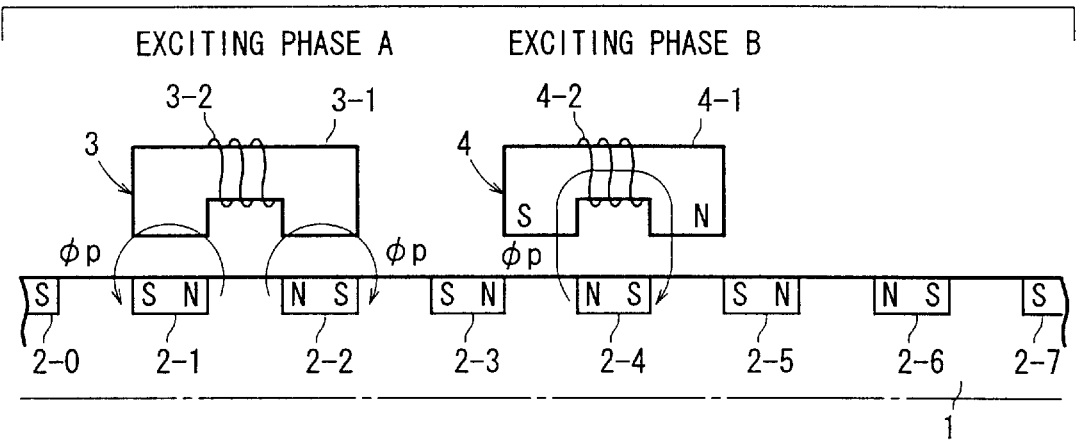
FIG. 2A illustrates the initial position in the non-excited state of the linear motor according to the embodiment of the present invention.

As shown in FIG. 2A, it is assumed that the legs of the electromagnet 3 are approximately opposed to the permanent magnet 2-1 and the permanent magnet 2-2, one leg of the electromagnet 4 is approximately opposed to the field yoke portion between the permanent magnet 2-3 and the permanent magnet 2-4, and the other leg of the electromagnet 4 is approximately opposed to the field yoke portion between the permanent magnet 2-4 and the permanent magnet 2-5 at the initial position at which the electromagnets 3, 4 are not excited.

The magnetic field φp is generated in the direction from the field yoke portion between the permanent magnet 2-1 and the permanent magnet 2-2 via one leg of the electromagnet core 3-1 to the S magnetic pole of the permanent magnet 2-1, the magnetic field φp is generated in the direction from the field yoke portion between the permanent magnet 2-1 and the permanent magnet 2-2 via the other leg of the electromagnet core 3-1 to the S magnetic pole of the permanent magnet 2-2, and the magnetic field φp is generated in the direction from the field yoke portion between the permanent magnet 2-3 and the permanent magnet 2-4 to the S magnetic pole of the permanent magnet 2-4 via the electromagnet core 4-1.

Figure 2B:
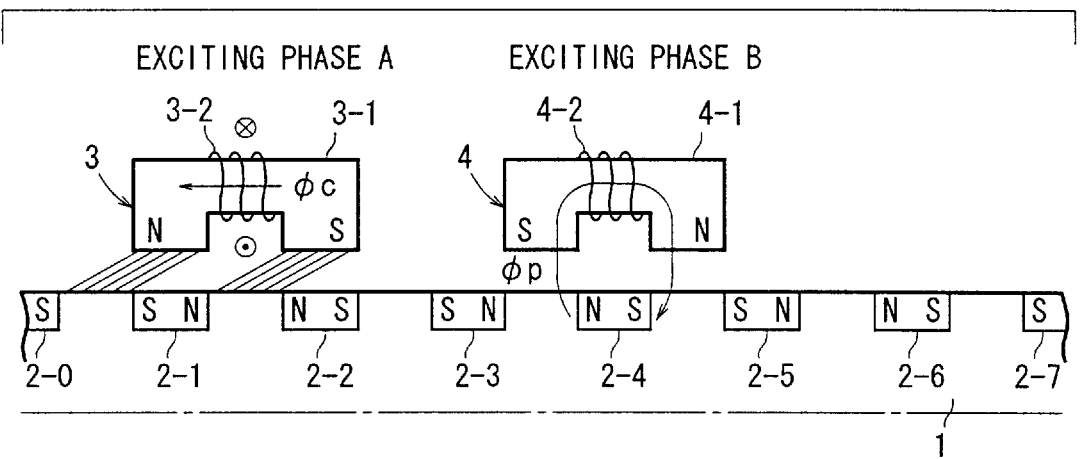
FIG. 2B illustrates the attraction brought about by the magnetic field generated when the electric power is applied to an exciting phase A, and FIG. 2C illustrate a field magnet yoke shifted by one step by the thrust force generated by the attraction brought about when the electric power is applied to the exciting phase A.

Starting from the state shown in FIG. 2A in which the exciting phase A is at the initial position, the electric power is applied to the coil 3-2, i.e., the exciting phase A in the direction shown in FIG. 2B. The electromagnet 3 is magnetized by the electric power application, and the magnetic field φc is generated in the counterclockwise direction. The attraction is exerted between one leg of the electromagnet core 3-1 and the field yoke portion between the permanent magnet 2-0 and the permanent magnet 2-1. The attraction is exerted between the other leg of the electromagnet core 3-1 and the field yoke portion between the permanent magnet 2-1 and the permanent magnet 2-2. Thus, the thrust force is generated.

Figure 2C:
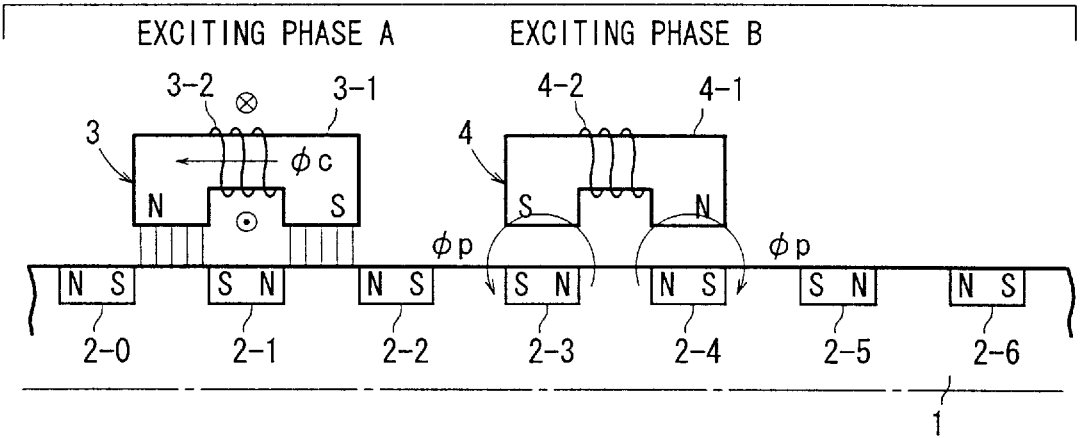
Figure 3A:
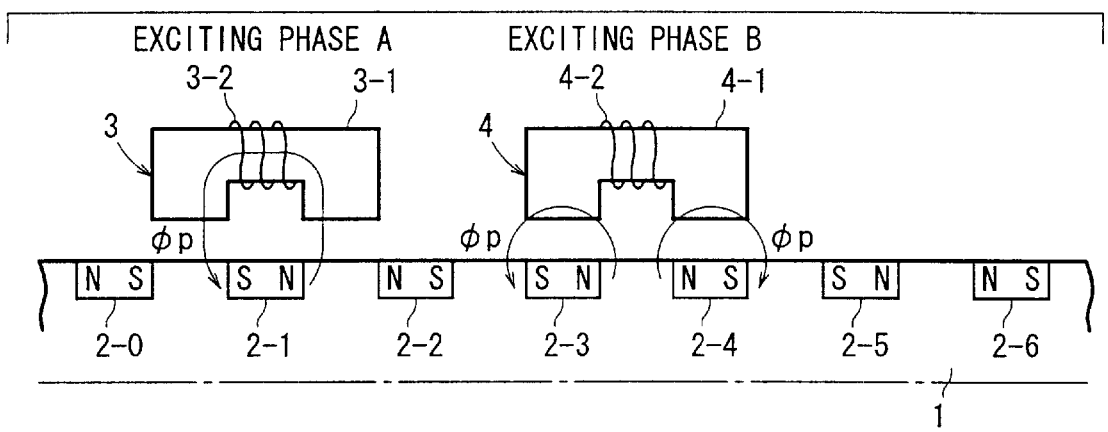
FIG. 3A illustrates the initial state in the non-excited state of the linear motor according to the embodiment of the present invention.
Figure 3B:
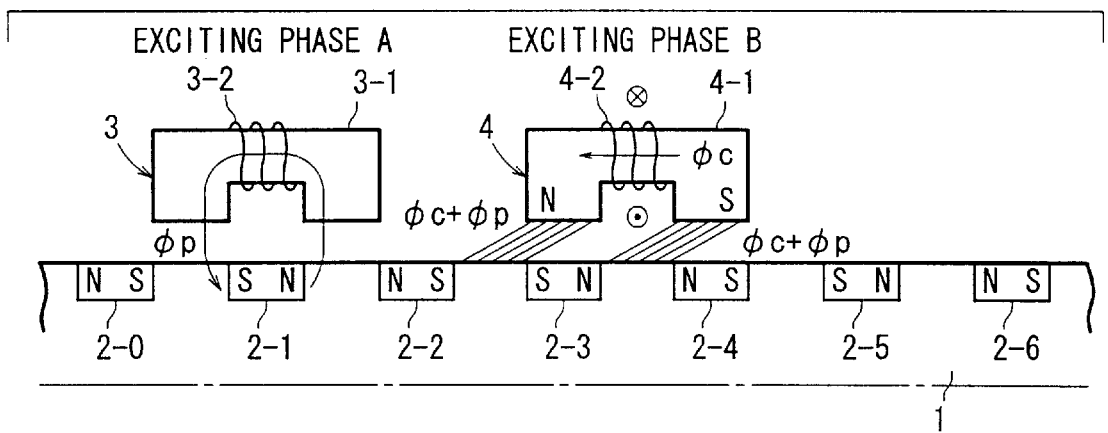
FIG. 3B illustrates the attraction brought about by the magnetic field generated when the electric power is applied to an exciting phase B.

The attraction, which is brought about by the excitation of the exciting phase A as described above, allows the field yoke 1 to move in the rightward direction by one step width determined by τe/m as shown in FIG. 2C. Subsequently, the excitation is once stopped. As shown in FIG. 3A, this state resides in the completion of electric power application to the exciting phase A, i.e., the state of the initial position of the exciting phase B. This state can be easily estimated by analogy from the case of the initial position of the exciting phase A, which is the same as that of the case of the initial position of the exciting phase A.

The exciting phase B is excited subsequently to the initial position of the exciting phase B shown in FIG. 3A. Starting from the state in which the exciting phase B is at the initial position, the electric power is applied to the coil 4-2, i.e., the exciting phase B in the direction shown in FIG. 3B. The magnetic field φc is generated in the counterclockwise direction in the electromagnet core 4-1 by the electric power application. The attraction is exerted between one leg of the electromagnet core 4-1 and the field yoke portion between the permanent magnet 2-2 and the permanent magnet 2-3. The attraction is exerted between the other leg of the electromagnet core 4-1 and the field yoke portion between the permanent magnet 2-3 and the permanent magnet 2-4. Thus, the thrust force is generated. Subsequently, the field yoke 1 is moved in the rightward direction by one step width determined by τe/m.

The thrust force is generated in the linear motor 10 according to the embodiment of the present invention, and the field yoke 1 is driven as described above.

Figure 5:
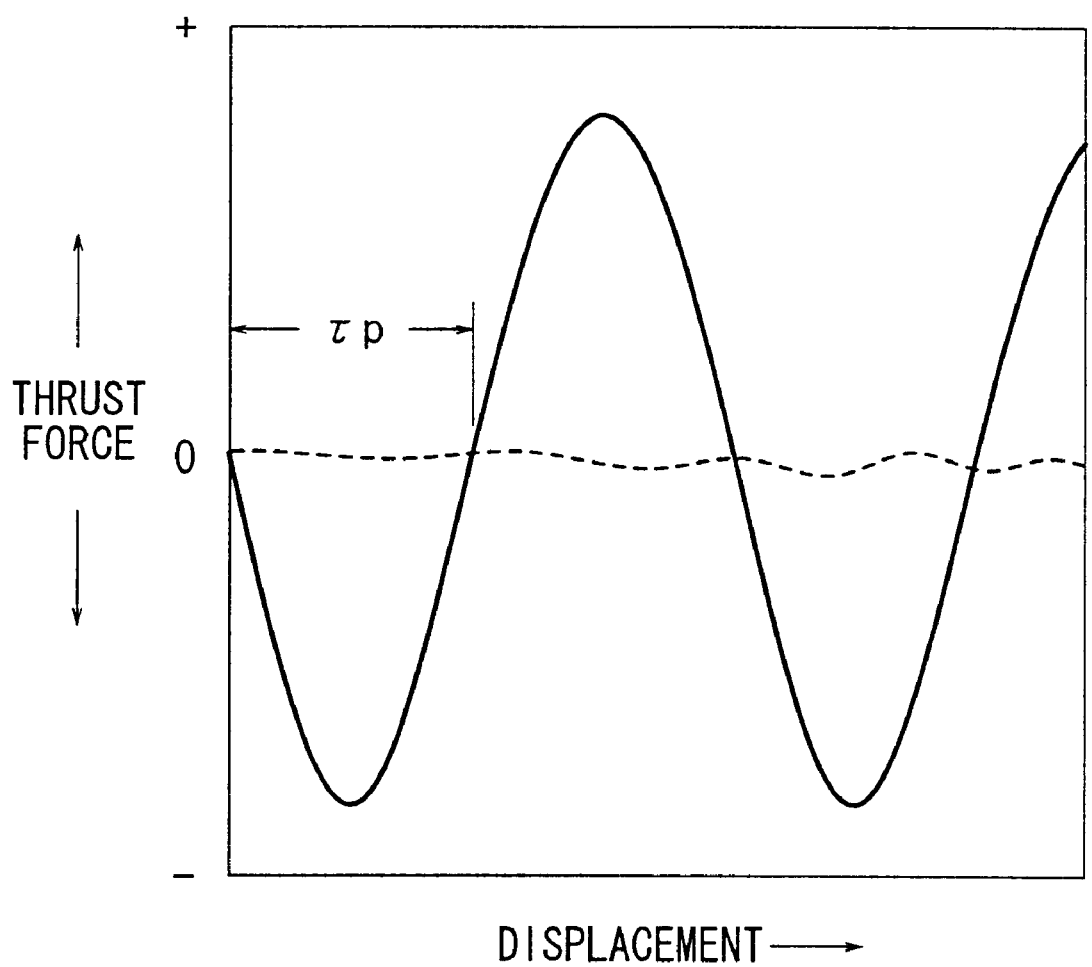
FIG. 5 shows a thrust force characteristic with respect to displacement in the linear motor according to the embodiment of the present invention.

In this process, the characteristic of the thrust force with respect to the displacement generated in the field yoke 1 is shown by a solid line in FIG. 5, and the characteristic of the detent force is shown by a broken line in FIG. 5.

Figure 6:
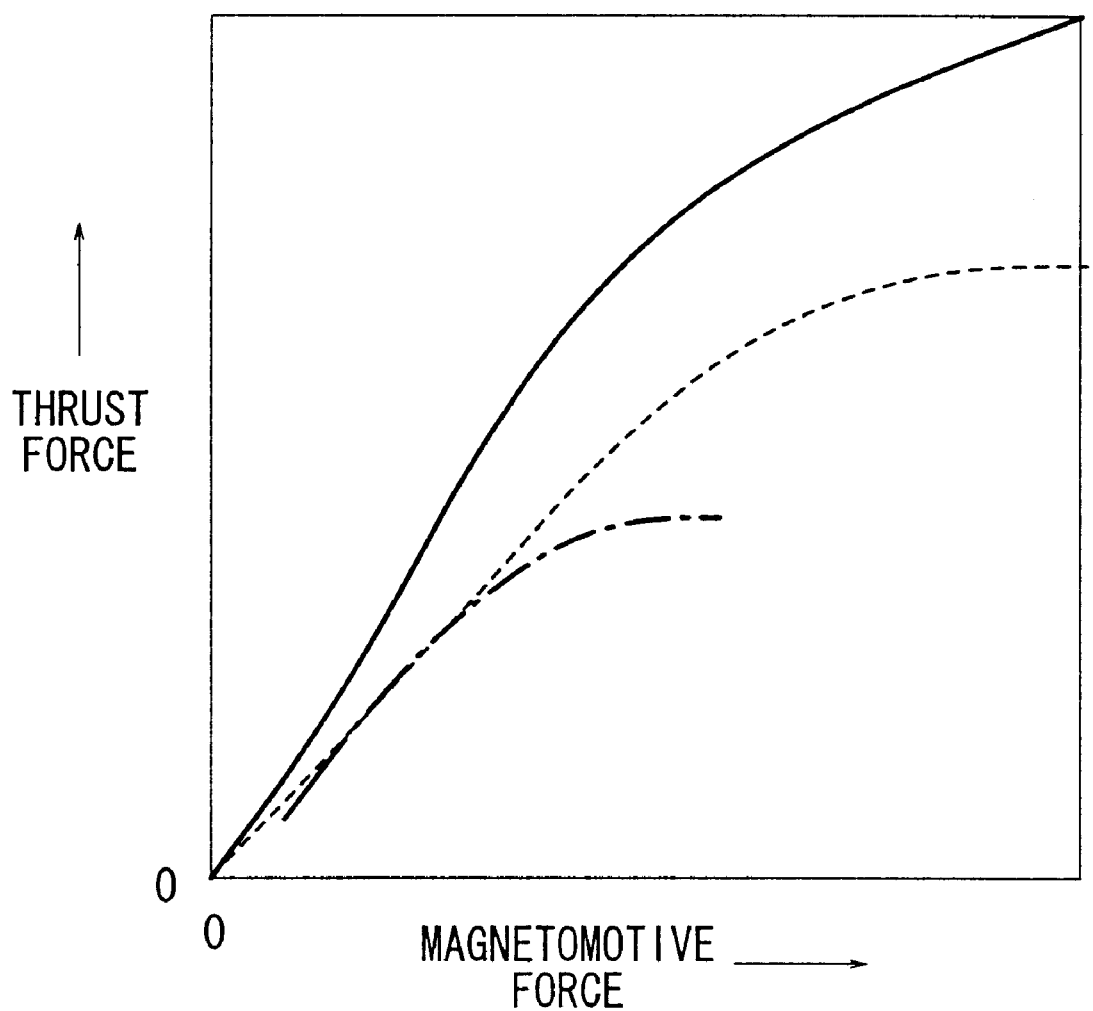
FIG. 6 schematically shows characteristics for making comparison between a thrust force characteristic of the linear motor according to the embodiment of the present invention and a thrust force characteristic of a conventional linear motor.

The relationship between the magnetomotive force brought about by the electromagnet and the thrust force was investigated to compare the case of the linear motor 10 according to the embodiment of the present invention, a case of a hybrid linear motor, and a case of a variable reluctance linear motor. Results were obtained as shown in FIG. 6. In FIG. 6, the case of the linear motor 10 according to the embodiment of the present invention is indicated by a solid line, the case of the hybrid linear motor is indicated by a broken line, and the case of the variable reluctance linear motor is indicated by a chain line.

As described above, according to the linear motor 10 of the embodiment of the present invention, the permanent magnets are embedded in the field yoke 1. As a result, the following advantages are obtained.

(a) The direction can be aligned or uniformalized for the thrust forces generated on the legs of the electromagnet cores 3-1, 4-1 of the electromagnets 3, 4. It is possible to obtain the thrust force which is about twice that of the conventional variable reluctance linear motor and the hybrid linear motor.

(b) When the permanent magnets are embedded in the field yoke 1, the reluctance force, which is the thrust force of the variable reluctance linear motor, can be also generated in addition to the force based on the Fleming's rule as the thrust force of the DC motor. The forces act to generate the large thrust force with the compact size of the linear motor 10 according to the embodiment of the present invention as compared with the conventional linear motor.

(c) The electromagnets 3, 4 are successively arranged on the basis of the number of exciting phases, and thus the magnetic circuit for the electromagnet is independent for each one phase. Therefore, for example, it is possible to adopt a variety of exciting methods such as the 1-phase excitation and the 1-2-phase excitation. Further, it is unnecessary to provide any yoke for magnetically coupling the respective phases. Therefore, it is possible to achieve the compact size.

The embodiment described above is illustrative of the case in which the field yoke 1 is moved. However, it is also possible to move any unit including the electromagnets 3, 4.

Figure 7:
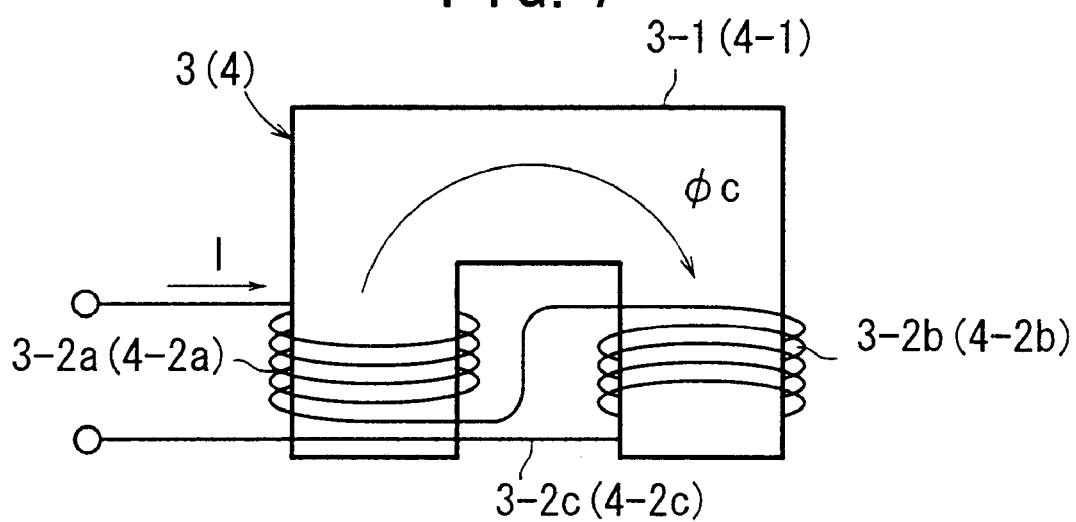
FIG. 7 schematically shows another arrangement of the electromagnet in the linear motor according to the embodiment of the present invention.

In place of the arrangement shown in FIG. 4 for the electromagnets 3, 4, an arrangement shown in FIG. 7 is also adopted. That is, a coil 3-2a (4-2a) is wound around one leg of the electromagnet core 3-1 (4-1), a coil 3-2b (4-2b) is wound around the other leg of the electromagnet core 3-1 (4-1), and both coils 3-2a (4-2a), 3-2b (4-2b) are connected in series to form a differential coil 3-2c (4-2c). When the electric power is applied to the differential coil 3-2c (4-2c), one leg of the electromagnet core 3-1 (4-1) and the other leg of the electromagnet core 3-1 (4-1) are magnetized to have opposite magnetic polarity.

Next, the two-phase driving will be explained with reference to FIGS. 8 to 10.

In FIGS. 8A to 10B, the arrows, which are depicted in the gaps between the field yoke 1 and the electromagnets 3, 4, indicate the direction of generation of the thrust force. The arrows, which are directed upwardly, indicate the attraction, and the arrows, which are directed downwardly, indicate the repulsion.

The arrangement, which is adopted when the two-phase driving is performed, is basically the same as that shown in FIGS. 2A to 2C. A two-phase current, which includes phases deviated from each other by 90 degrees, flows through the exciting phase A and the exciting phase B to excite the electromagnets 3, 4 respectively. In this embodiment, it is assumed that the current flowing through the exciting phases A, B is a constant current having a constant level. That is, as shown in FIGS. 11A and 11B, the currents α, β flowing through the exciting phases A, B are rectangular waves having the phases deviated from each other by 90 degrees.

Figure 10A:
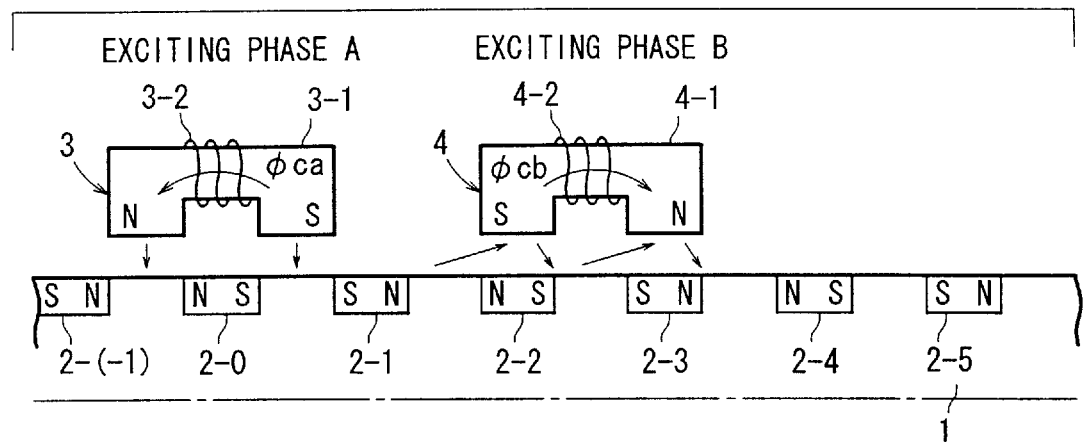
FIG. 10A illustrates the case in which the linear motor according to the embodiment of the present invention is subjected to the two-phase excitation by using the pulsed two-phase driving current (see FIGS. 11A and 11B) having the phases deviated by 90 degrees to illustrate the attraction and the repulsion brought about when the two-phase driving current is applied in "interval g" shown in FIGS. 11A and 11B.
Figure 10B:
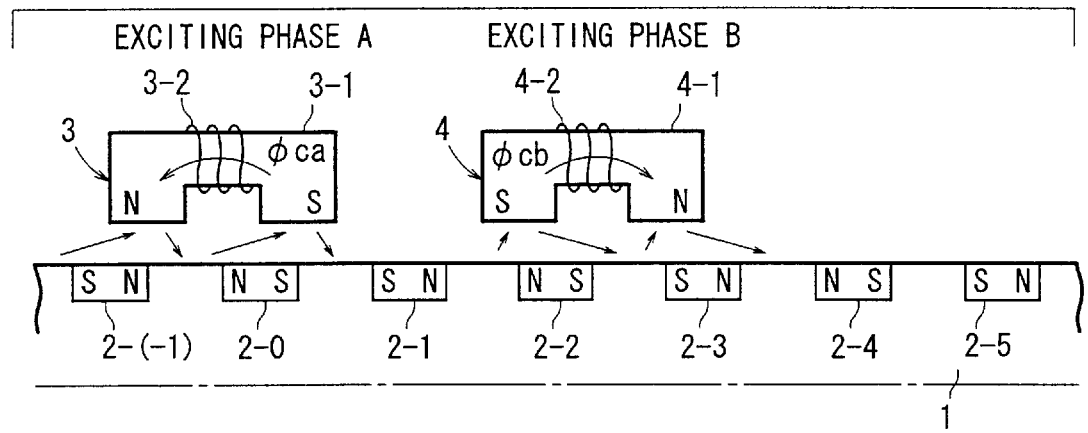
FIG. 10B illustrates the attraction and the repulsion brought about when the two-phase driving current is applied in "interval h" shown in FIGS. 11A and 11B.
Figures 11A, 11B:
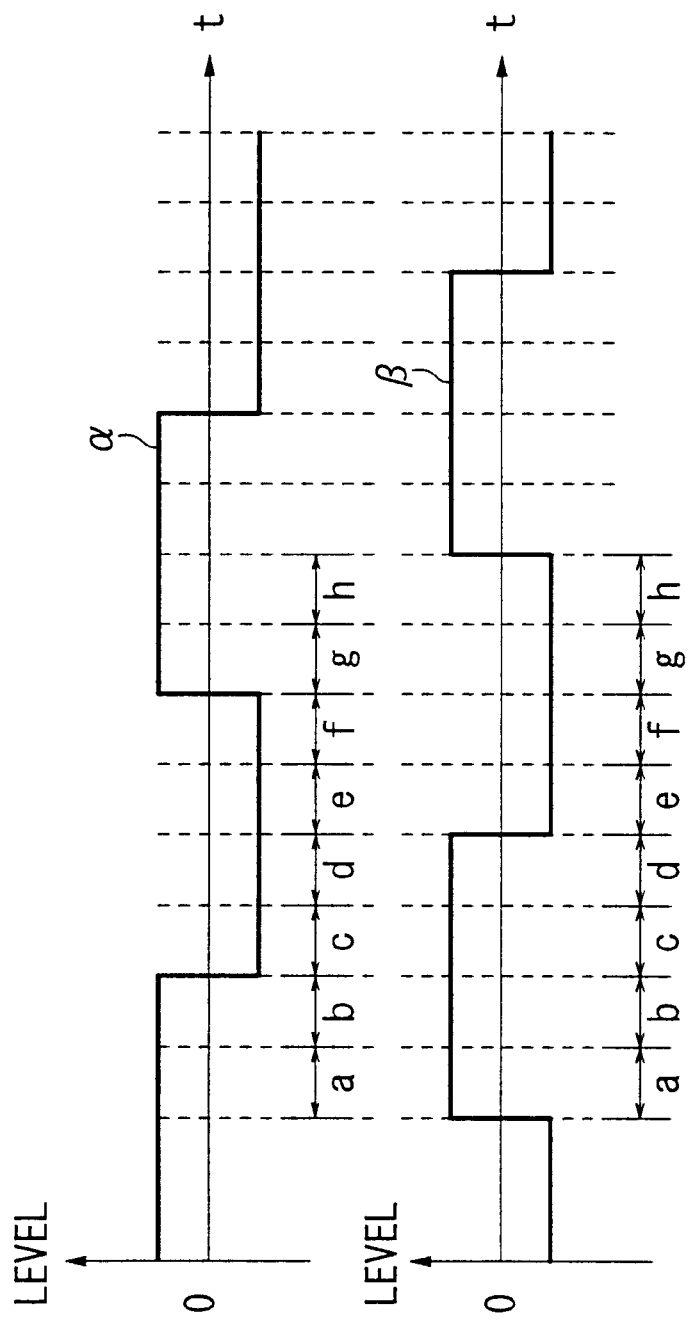
FIGS. 11A and 11B schematically show waveforms of the exciting current to be used when the linear motor according to the-embodiment of the present invention is subjected to the two-phase excitation respectively.

In the following description, as shown in FIGS. 11A and 11B, the phases of the exciting current are divided by every 45 degrees to provide respective current intervals a, b, c, d, e, f, g, h which correspond to FIG. 8A, FIG. 8B, FIG. 8C, FIG. 9A, FIG. 9B, FIG. 9C, FIG. 10A, and FIG. 10B respectively. Explanation will be made on the basis of FIG. 8A, FIG. 8B, FIG. 8C, FIG. 9A, FIG. 9B, FIG. 9C, FIG. 10A, and FIG. 10B.

Figure 8A:
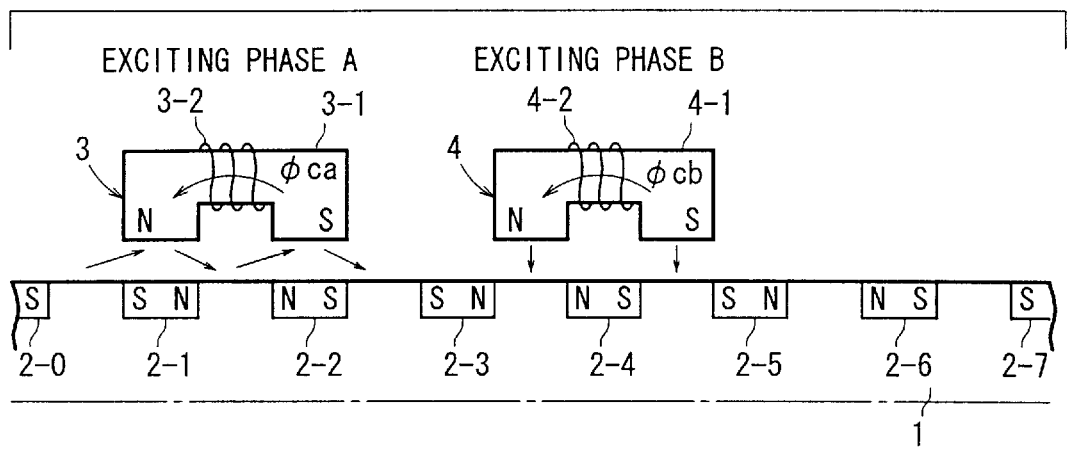
FIG. 8A illustrates a case in which the linear motor according to the embodiment of the present invention is subjected to the two-phase excitation by using a pulsed two-phase driving current (see FIGS. 11A and 11B) having phases deviated by 90 degrees to illustrate the attraction and the repulsion brought about when the two-phase driving current is applied in "interval a" shown in FIGS. 11A and 11B.

In the current interval a, as shown in FIG. 8A, the electromagnet core 3-1 is magnetized to generate the magnetic field φca by applying the electric power to the exciting phase A, and the electromagnet core 4-1 is magnetized to generate the magnetic field φcb by applying the electric power to the exciting phase B.

Therefore, the N magnetic pole is generated on one leg of the electromagnet core 3-1, and the S magnetic pole is generated on the other leg of the electromagnet core 3-1. The attraction is generated between the field yoke portion between the permanent magnet 2-0 and the permanent magnet 2-1 and one leg of the electromagnet core 3-1 and between the field yoke portion between the permanent magnet 2-1 and the permanent magnet 2-2 and the other leg of the electromagnet core 3-1. The repulsion is generated between the field yoke portion between the permanent magnet 2-1 and the permanent magnet 2-2 and one leg of the electromagnet core 3-1 and between the field yoke portion between the permanent magnet 2-2 and the permanent magnet 2-3 and the other leg of the electromagnet core 3-1.

Simultaneously, the N magnetic pole is generated on one leg of the electromagnet core 4-1, and the S magnetic pole is generated on the other leg of the electromagnet core 4-1. The repulsion is generated between the field yoke portion between the permanent magnet 2-3 and the permanent magnet 2-4 and one leg of the electromagnet core 4-1 and between the field yoke portion between the permanent magnet 2-4 and the permanent magnet 2-5 and the other leg of the electromagnet core 4-1.

Figure 8B:
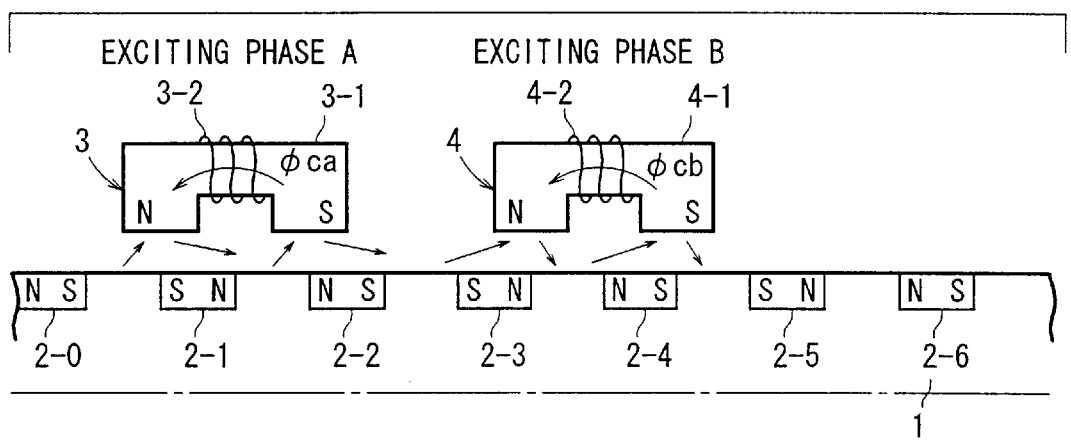
FIG. 8B illustrates the attraction and the repulsion brought about when the two-phase driving current is applied in "interval b" shown in FIGS. 11A and 11B.

As a result, the field yoke 1 is moved to give a state shown in FIG. 8B.

In the current interval b, as shown in FIG. 8B, the electromagnet core 3-1 is magnetized to generate the magnetic field φca by applying the electric power to the exciting phase A, and the electromagnet core 4-1 is magnetized to generate the magnetic field φcb by applying the electric power to the exciting phase B.

Therefore, the N magnetic pole is generated on one leg of the electromagnet core 3-1, and the S magnetic pole is generated on the other leg of, the electromagnet core 3-1. The attraction is generated between the field yoke portion between the permanent magnet 2-0 and the permanent magnet 2-1 and one leg of the electromagnet core 3-1 and between the field yoke portion between the permanent magnet 2-1 and the permanent magnet 2-2 and the other leg of the electromagnet core 3-1. The repulsion is generated between the field yoke portion between the permanent magnet 2-1 and the permanent magnet 2-2 and one leg of the electromagnet core 3-1 and between the field yoke portion between the permanent magnet 2-2 and the permanent magnet 2-3 and the other leg of the electromagnet core 3-1.

Simultaneously, the N magnetic pole is generated on one leg of the electromagnet core 4-1, and the S magnetic pole is generated on the other leg of the electromagnet core 4-1. The attraction is generated between the field yoke portion between the permanent magnet 2-2 and the permanent magnet 2-3 and one leg of the electromagnet core 4-1 and between the field yoke portion between the permanent magnet 2-3 and the permanent magnet 2-4 and the other leg of the electromagnet core 4-1. The repulsion is generated between the field yoke portion between the permanent magnet 2-3 and the permanent magnet 2-4 and one leg of the electromagnet core 4-1 and between the field yoke portion between the permanent magnet 2-4 and the permanent magnet 2-5 and the other leg of the electromagnet core 4-1.

Figure 8C:
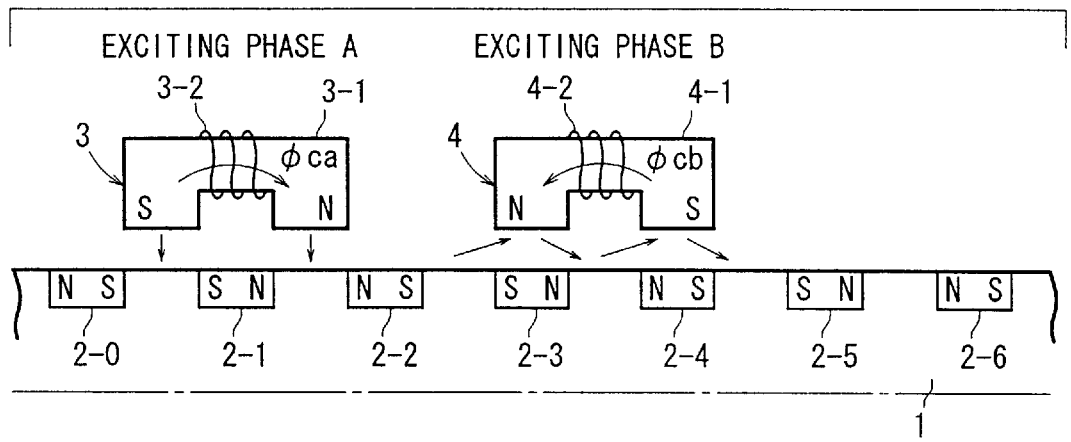
FIG. 8C illustrates the attraction and the repulsion brought about when the two-phase driving current is applied in "interval c" shown in FIGS. 11A and 11B.

As a result, the field yoke 1 is once stopped as shown in FIG. 8C. The field yoke 1 is moved by one step width determined by τe/m in the rightward direction from the state shown in FIG. 8A via the state shown in FIG. 8B to the state shown in FIG. 8C.

In the current interval c, as shown in FIG. 8C, the electromagnet core 3-1 of the electromagnet 3 is magnetized in the opposite polarity to generate the magnetic field φca by applying the electric power to the exciting phase A in the direction opposite to that of the case shown in FIG. 8A, and the electromagnet core 4-1 is magnetized to generate the magnetic field φcb by applying the electric power to the exciting phase B.

Therefore, the S magnetic pole is generated on one leg of the electromagnet core 3-1, and the N magnetic pole is generated on the other leg of the electromagnet core 3-1. The repulsion is generated between the field yoke portion between the permanent magnet 2-0 and the permanent magnet 2-1 and one leg of the electromagnet core 3-1 and between the field yoke portion between the permanent magnet 2-1 and the permanent magnet 2-2 and the other leg of the electromagnet core 3-1.

Simultaneously, the N magnetic pole is generated on one leg of the electromagnet core 4-1, and the S magnetic pole is generated on the other leg of the electromagnet core 4-1. The attraction is generated between the field yoke portion between the permanent magnet 2-2 and the permanent magnet 2-3 and one leg of the electromagnet core 4-1 and between the field yoke portion between the permanent magnet 2-3 and the permanent magnet 2-4 and the other leg of the electromagnet core 4-1. The repulsion is generated between the field yoke portion between the permanent magnet 2-3 and the permanent magnet 2-4 and one leg of the electromagnet core 4-1 and between the field yoke portion between the permanent magnet 2-4 and the permanent magnet 2-5 and the other leg of the electromagnet core 4-1.

Figure 9A:
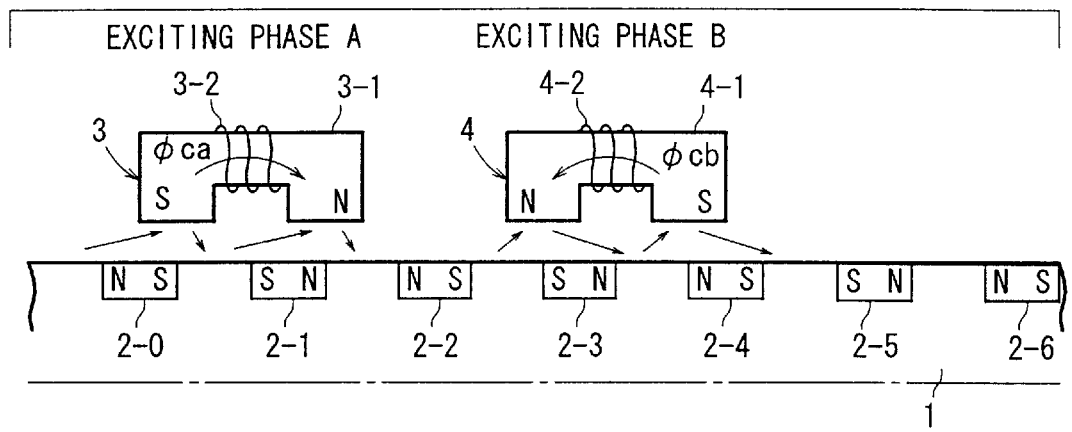
FIG. 9A illustrates the case in which the linear motor according to the embodiment of the present invention is subjected to the two-phase excitation by using the pulsed two-phase driving current (see FIGS. 11A and 11B) having the phases deviated by 90 degrees to illustrate the attraction and the repulsion brought about when the two-phase driving current is applied in "interval d" shown in FIGS. 11A and 11B.

As a result, the field yoke 1 is moved to give a state shown in FIG. 9A.

In the current interval d, as shown in FIG. 9A, the electromagnet core 3-1 is magnetized to generate the magnetic field φca by applying the electric power to the exciting phase A in the direction opposite to that of the case shown in FIG. 8A, and the electromagnet core 4-1 is magnetized to generate the magnetic field φcb by applying the electric power to the exciting phase B.

Therefore, the S magnetic pole is generated on one leg of the electromagnet core 3-1, and the N magnetic pole is generated on the other leg of the electromagnet core 3-1. The attraction is generated between the field yoke portion between the permanent magnet 2-(−1) and the permanent magnet 2-0 and one leg of the electromagnet core 3-1 and between the field yoke portion between the permanent magnet 2-0 and the permanent magnet 2-1 and the other leg of the electromagnet core 3-1. The repulsion is generated between the field yoke portion between the permanent magnet 2-0 and the permanent magnet 2-1 and one leg of the electromagnet core 3-1 and between the field yoke portion between the permanent magnet 2-1 and the permanent magnet 2-2 and the other leg of the electromagnet core 3-1.

Simultaneously, the N magnetic pole is generated on one leg of the electromagnet core 4-1, and the S magnetic pole is generated on the other leg of the electromagnet core 4-1. The attraction is generated between the field yoke portion between the permanent magnet 2-2 and the permanent magnet 2-3 and one leg of the electromagnet core 4-1 and between the field yoke portion between the permanent magnet 2-3 and the permanent magnet 2-4 and the other leg of the electromagnet core 4-1. The repulsion is generated between the field yoke portion between the permanent magnet 2-3 and the permanent magnet 2-4 and one leg of the electromagnet core 4-1 and between the field yoke portion between the permanent magnet 2-4 and the permanent magnet 2-5 and the other leg of the electromagnet core 4-1.

Figure 9B:
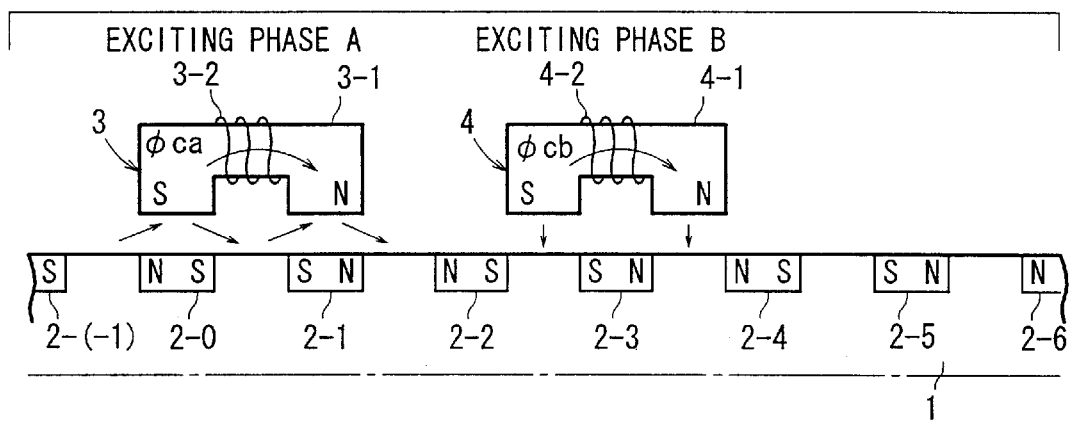
FIG. 9B illustrates the attraction and the repulsion brought about when the two-phase driving current is applied in "interval e" shown in FIGS. 11A and 11B.

As a result, the field yoke 1 is moved to stop as shown in FIG. 9B. The field yoke 1 is moved by one step width determined by τe/m in the rightward direction from the state shown in FIG. 8C via the state shown in FIG. 9A to the state shown in FIG. 9B.

In the current interval e, as shown in FIG. 9B, the electromagnet core 3-1 is magnetized to generate the magnetic field φca by applying the electric power to the exciting phase A in the direction opposite to that of the case shown in FIG. 8A, and the electromagnet core 4-1 is magnetized to generate the magnetic field φcb by applying the electric power to the exciting phase B in the direction opposite to that of the case shown in FIG. 8A.

Therefore, the S magnetic pole is generated on one leg of the electromagnet core 3-1, and the N magnetic pole is generated on the other leg of the electromagnet core 3-1. The attraction is generated between the field yoke portion between the permanent magnet 2-(−1) and the permanent magnet 2-0 and one leg of the electromagnet core 3-1 and between the field yoke portion between the permanent magnet 2-0 and the permanent magnet 2-1 and the other leg of the electromagnet core 3-1. The repulsion is generated between the field yoke portion between the permanent magnet 2-0 and the permanent magnet 2-1 and one leg of the electromagnet core 3-1 and between the field yoke portion between the permanent magnet 2-1 and the permanent magnet 2-2 and the other leg of the electromagnet core 3-1.

Simultaneously, the S magnetic pole is generated on one leg of the electromagnet core 4-1, and the N magnetic pole is generated on the other leg of the electromagnet core 4-1. The repulsion is generated between the field yoke portion between the permanent magnet 2-2 and the permanent magnet 2-3 and one leg of the electromagnet core 4-1 and between the field yoke portion between the permanent magnet 2-3 and the permanent magnet 2-4 and the other leg of the electromagnet core 4-1.

Figure 9C:
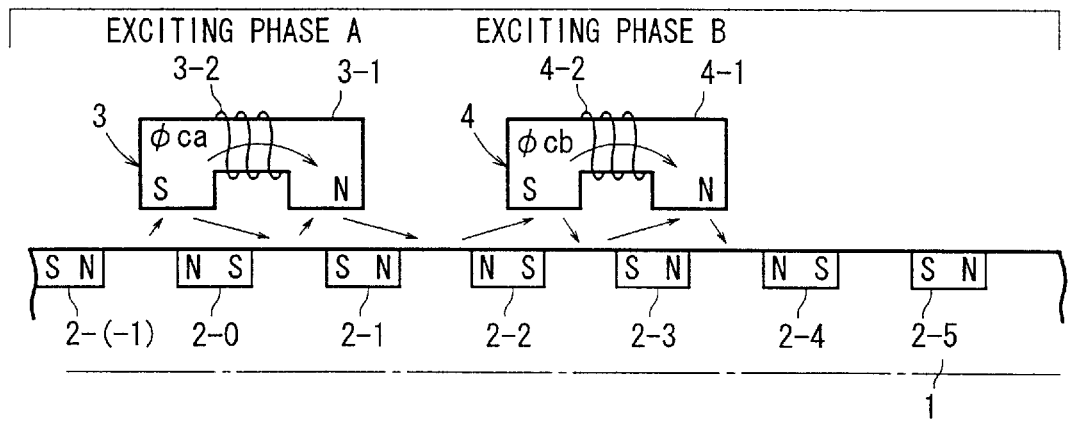
FIG. 9C illustrates the attraction and the repulsion brought about when the two-phase driving current is applied in "interval f" shown in FIGS. 11A and 11B.

As a result, the field yoke 1 is moved to give a state shown in FIG. 9C.

The operation is also performed for the current intervals f, g, h as shown in FIGS. 9C, 10A, and 10B. The function in these cases can be easily estimated by analogy from the function effected in the current intervals a, b, c, d, e.

Figure 12:
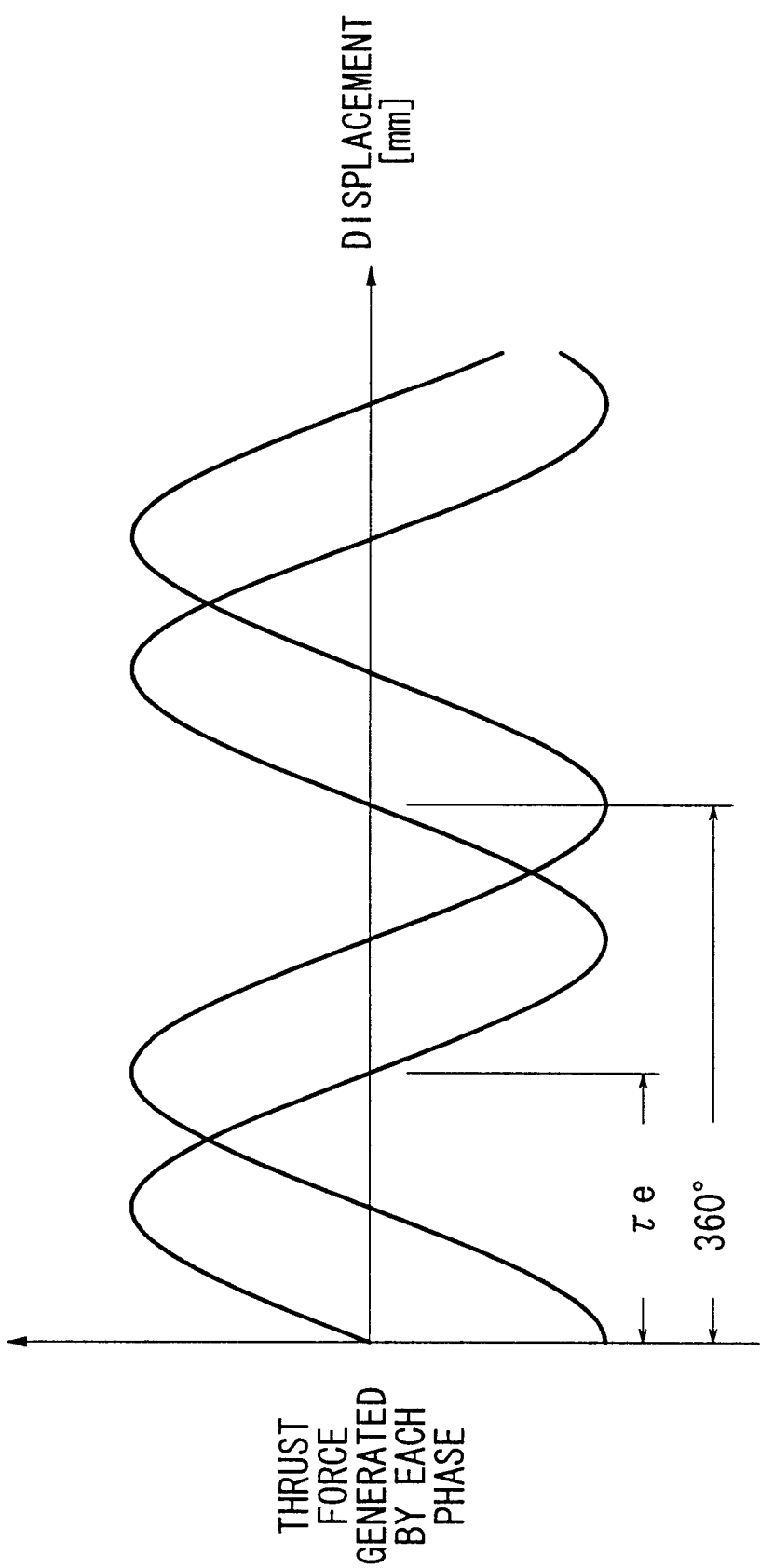
FIG. 12 shows thrust force characteristics illustrating thrust forces generated in respective phases when the linear motor according to the embodiment of the present invention is subjected to the two-phase excitation.

When the driving is performed by means of the two-phase excitation shown in FIGS. 8A to 10B, the thrust force generated by each phase is as shown in FIG. 12.

As also clarified from the above, the linear motor 10 according to the embodiment of the present invention can be driven by means of the one-phase driving and the two-phase driving as shown in FIGS. 2A to 3B and FIGS. 8A to 10B.

Figure 13:
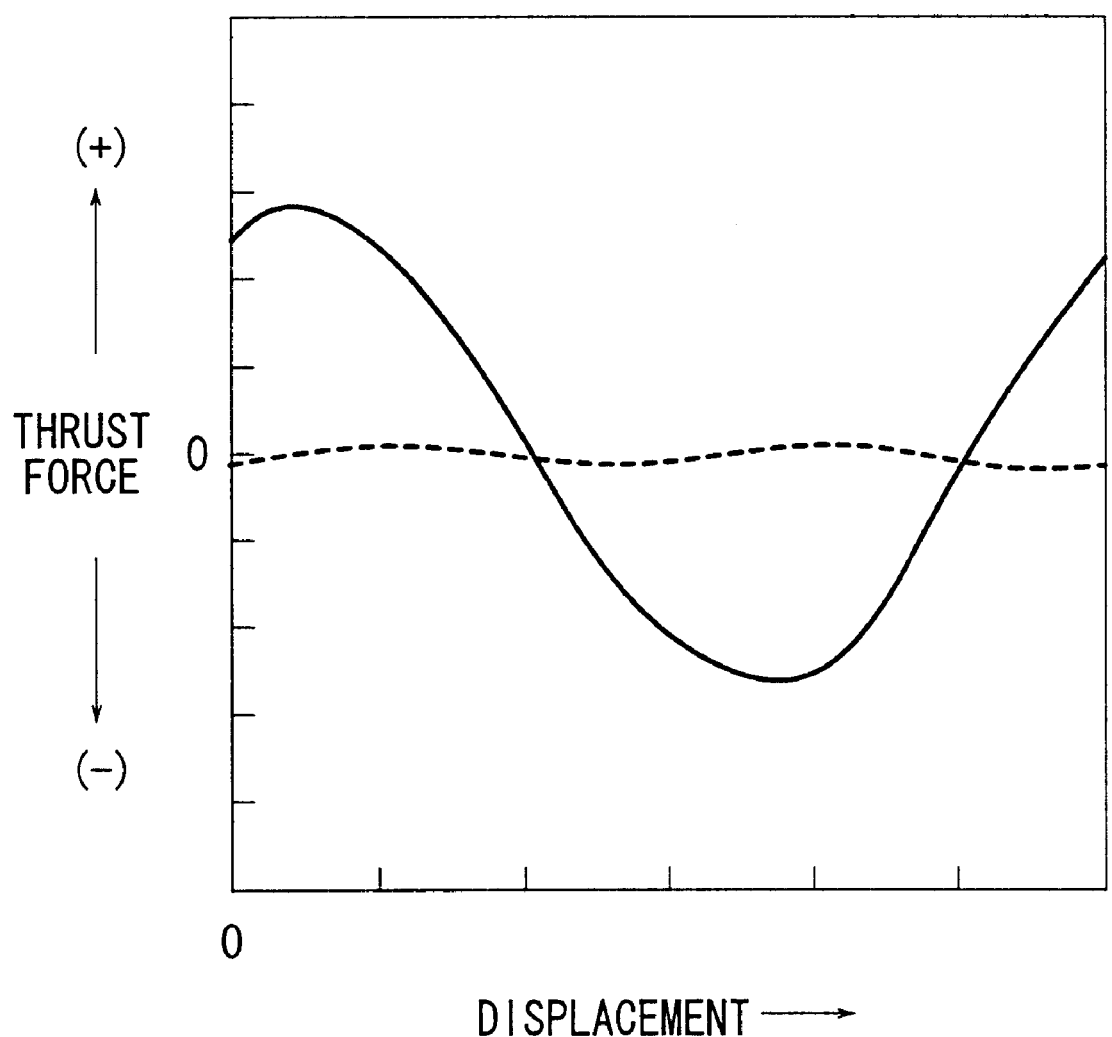
FIG. 13 shows thrust force characteristics illustrating a thrust force with respect to displacement in the linear motor according to the embodiment of the present invention, and a thrust force with respect to displacement in a conventional variable reluctance linear motor.

When the thrust force characteristic with respect to the displacement of the linear motor 10 according to the embodiment of the present invention was compared with the thrust force characteristic with respect to the displacement of a variable reluctance linear motor, the result was obtained as shown in FIG. 13. The thrust force characteristic with respect to the displacement of the linear motor 10 according to the embodiment of the present invention was by far satisfactory. In FIG. 13, the solid line indicates the thrust force characteristic with respect to the displacement of the linear motor 10 according to the embodiment of the present invention, and the broken line indicates the thrust force characteristic with respect to the displacement of the variable reluctance linear motor.

Figure 14:
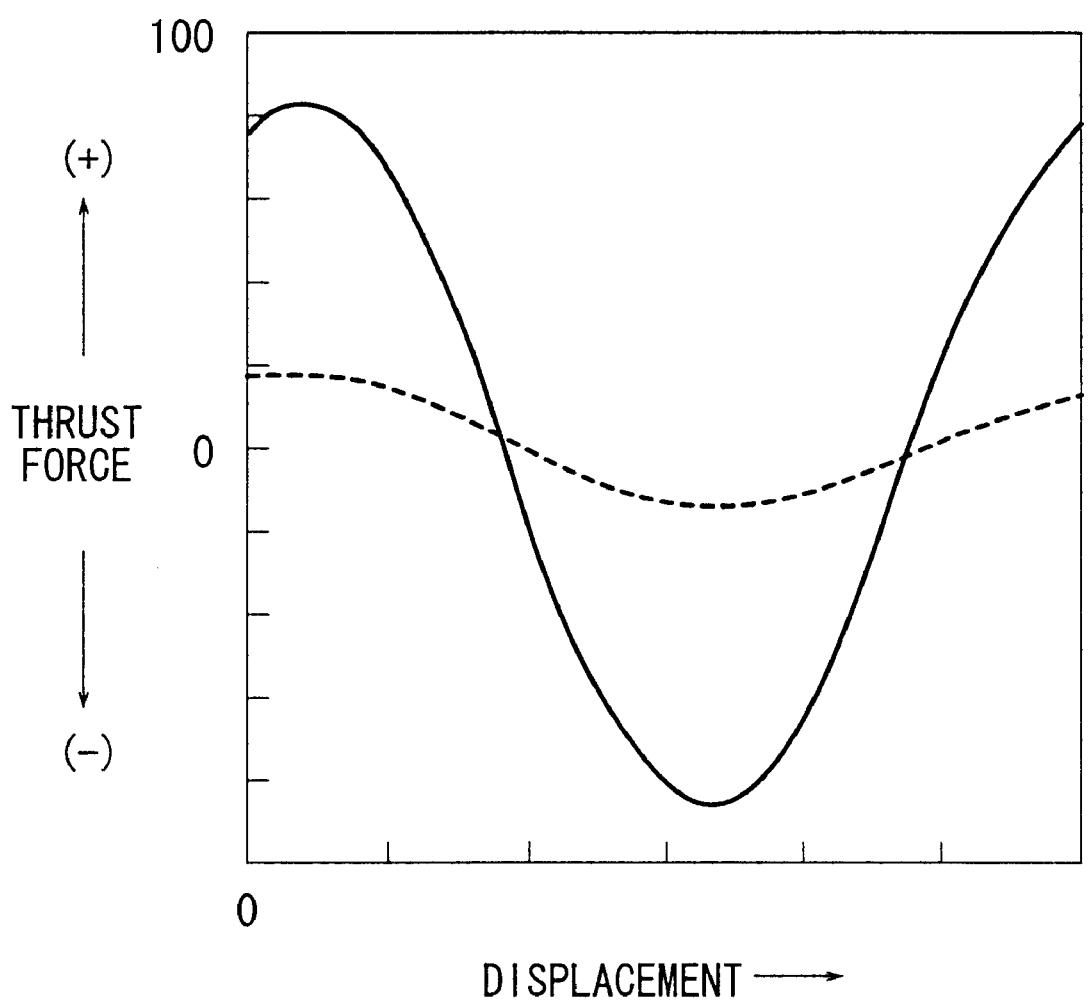
FIG. 14 shows a thrust force characteristic illustrating a thrust force with respect to displacement in the linear motor according to the embodiment of the present invention obtained when the embedding length of the permanent magnet is changed.

The thrust force characteristic with respect to the displacement of the linear motor 10 according to the embodiment of the present invention, which was obtained when the embedding length of the permanent magnet embedded in the field yoke 1 (this term will be referred to as "embedding length of the permanent magnet", although the embedding length of the permanent magnet is also the embedding depth, because the permanent magnet is embedded so that the identical surface is formed together with the surface of the field yoke 1) was changed, was as shown in FIG. 14. In FIG. 14, the solid line indicates a case in which the embedding length of the permanent magnet embedded in the field yoke 1 is, for example, 2.5 mm, and the broken line indicates a case in which the embedding length of the permanent magnet embedded in the field yoke 1 is, for example, 1.0 mm. However, such a tendency was obtained that the saturation was given when the embedding length of the permanent magnet was not less than 3 mm.

Figure 15:
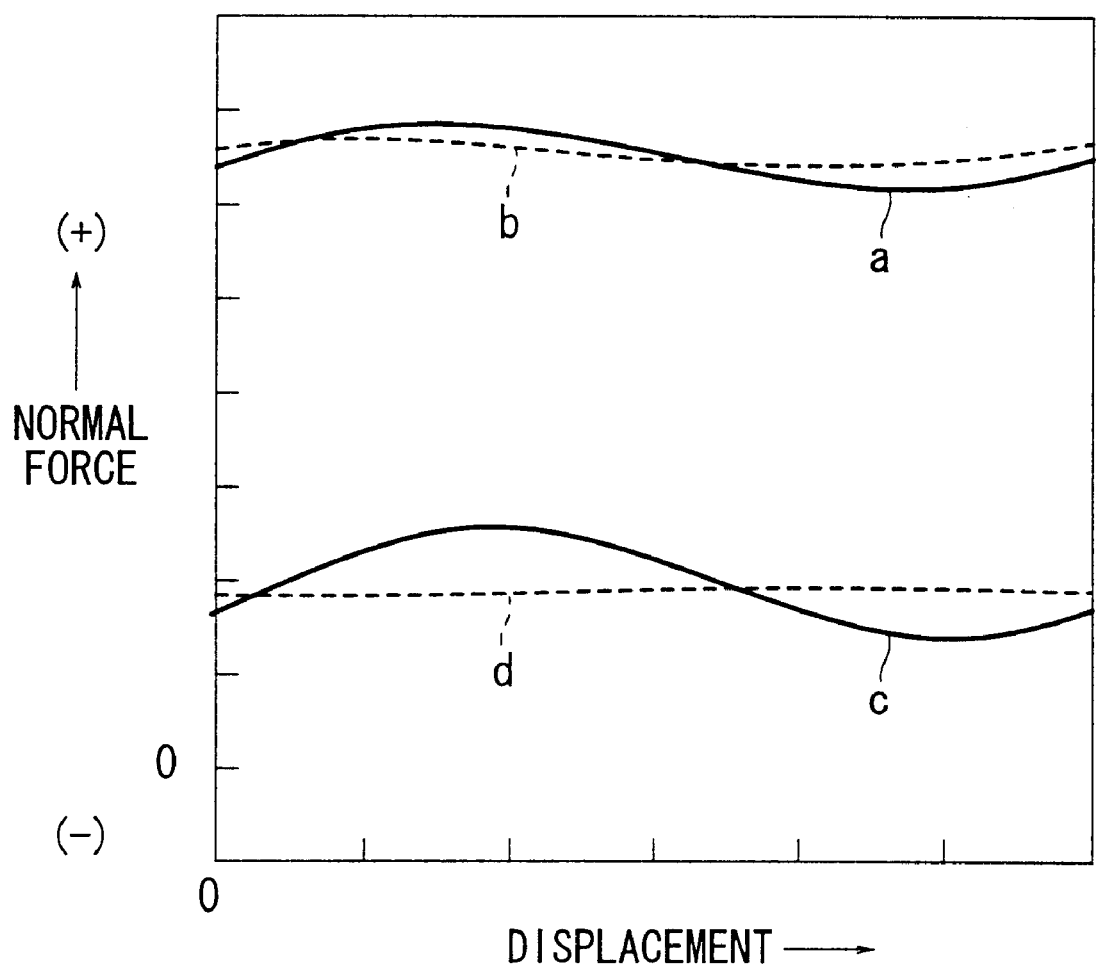
FIG. 15 shows a normal force characteristic illustrating a normal force with respect to displacement in the linear motor according to the embodiment of the present invention obtained when the embedding length of the permanent magnet is changed.

The normal force (force of attraction between the field yoke 1 and the electromagnet core 3-1, 4-1) characteristic with respect to the displacement of the field yoke 1 of the linear motor 10 according to the embodiment of the present invention was as shown in FIG. 15. In FIG. 15, the solid line a indicates a case in which the embedding length of the permanent magnet embedded in the field yoke 1 is, for example, 2.5 mm, and the solid line c indicates a case in which the embedding length of the permanent magnet embedded in the field yoke 1 is, for example, 1.0 mm. The broken lines b, d corresponding to the respective cases in FIG. 15 indicate the normal forces obtained when no electric power is applied to the coil.

Figure 16:
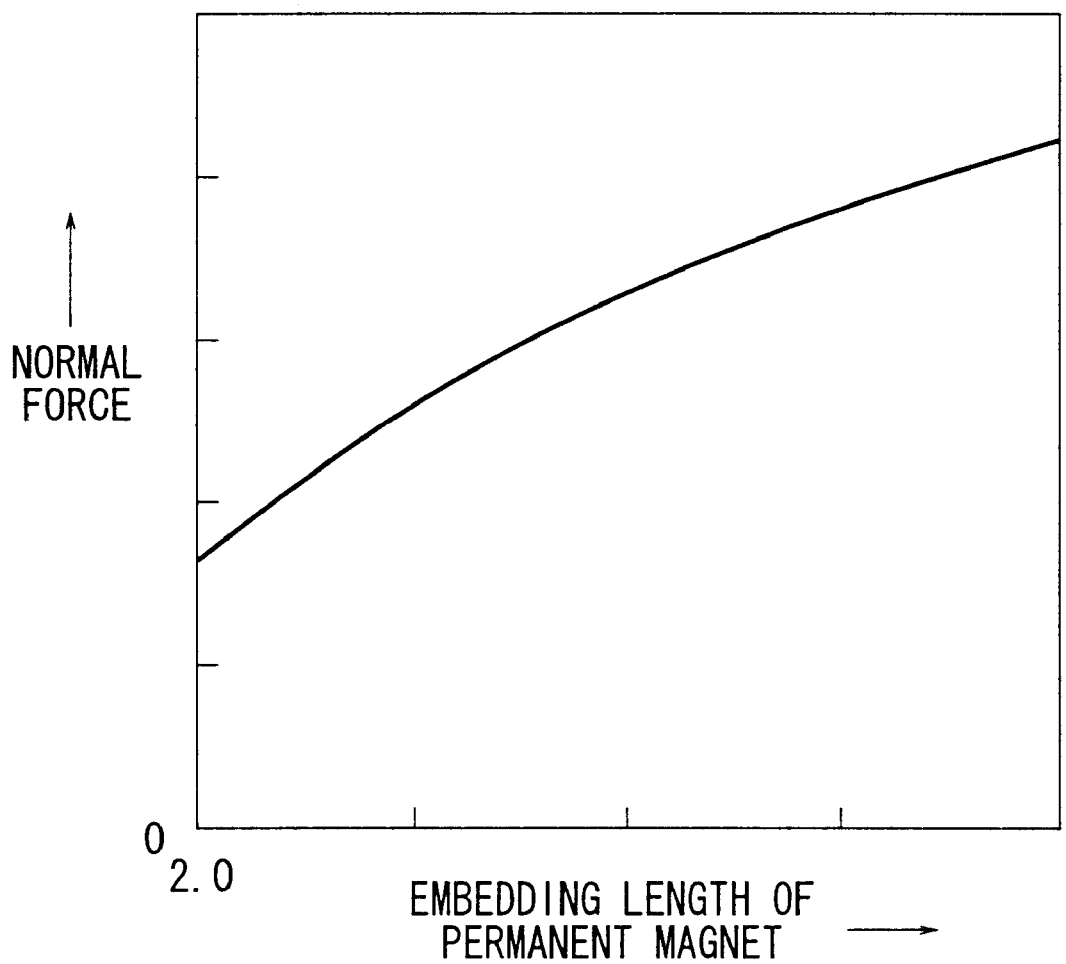
FIG. 16 shows a normal force characteristic illustrating a normal force with respect to the change of the embedding length of the permanent magnet in the linear motor according to the embodiment of the present invention.

The normal force characteristic, which was obtained when the embedding length of the permanent magnet embedded in the field yoke 1 was changed in the linear motor 10 according to the embodiment of the present invention, was as shown in FIG. 16.

Figure 17:
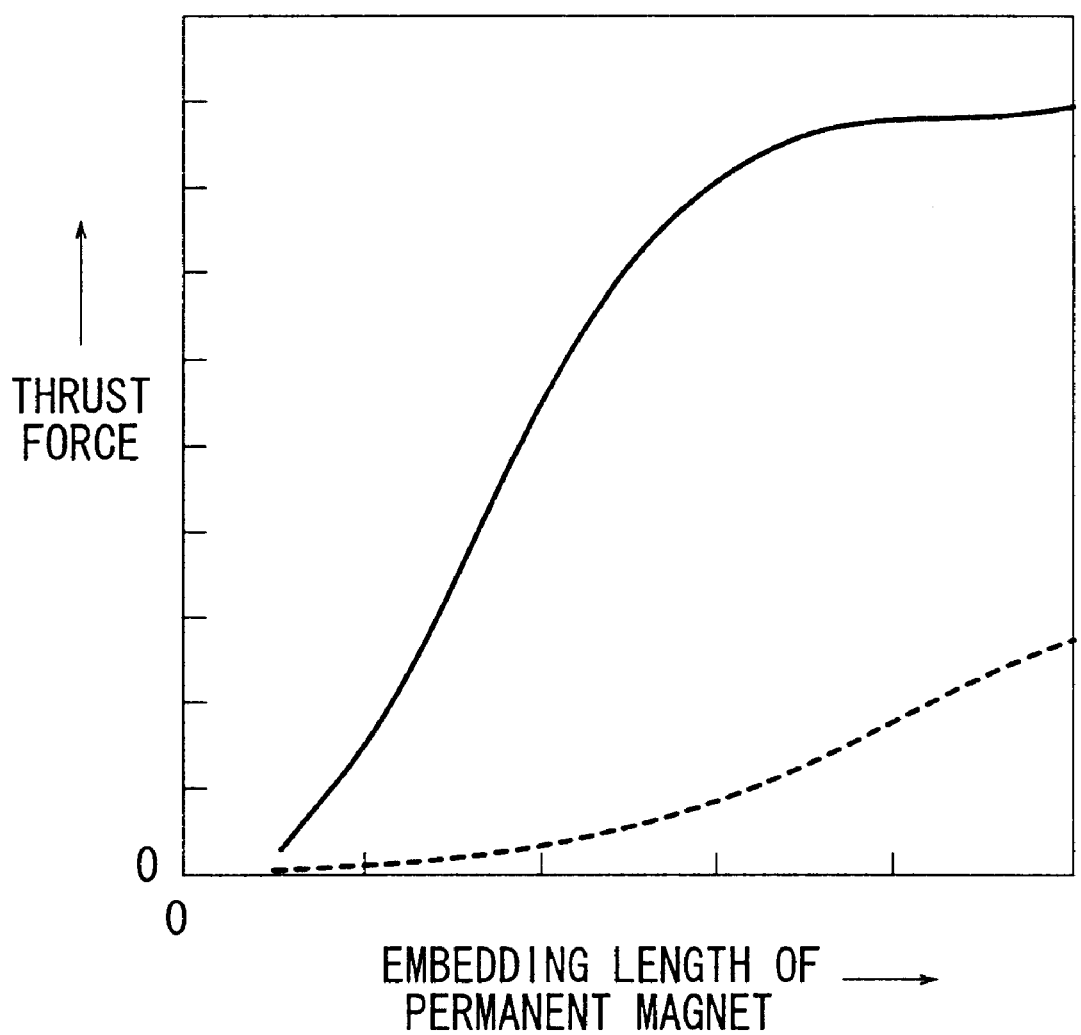
FIG. 17 shows a thrust force characteristic illustrating a thrust force with respect to the change of the embedding length of the permanent magnet in the linear motor according to the embodiment of the present invention.

The thrust force characteristic and the detent force characteristic, which were obtained when the embedding length of the permanent magnet embedded in the field yoke 1 was changed in the linear motor 10 according to the embodiment of the present invention, were as shown in FIG. 17. In FIG. 17, the solid line indicates the thrust force characteristic, and the broken line indicates the detent force characteristic.

Figure 18:
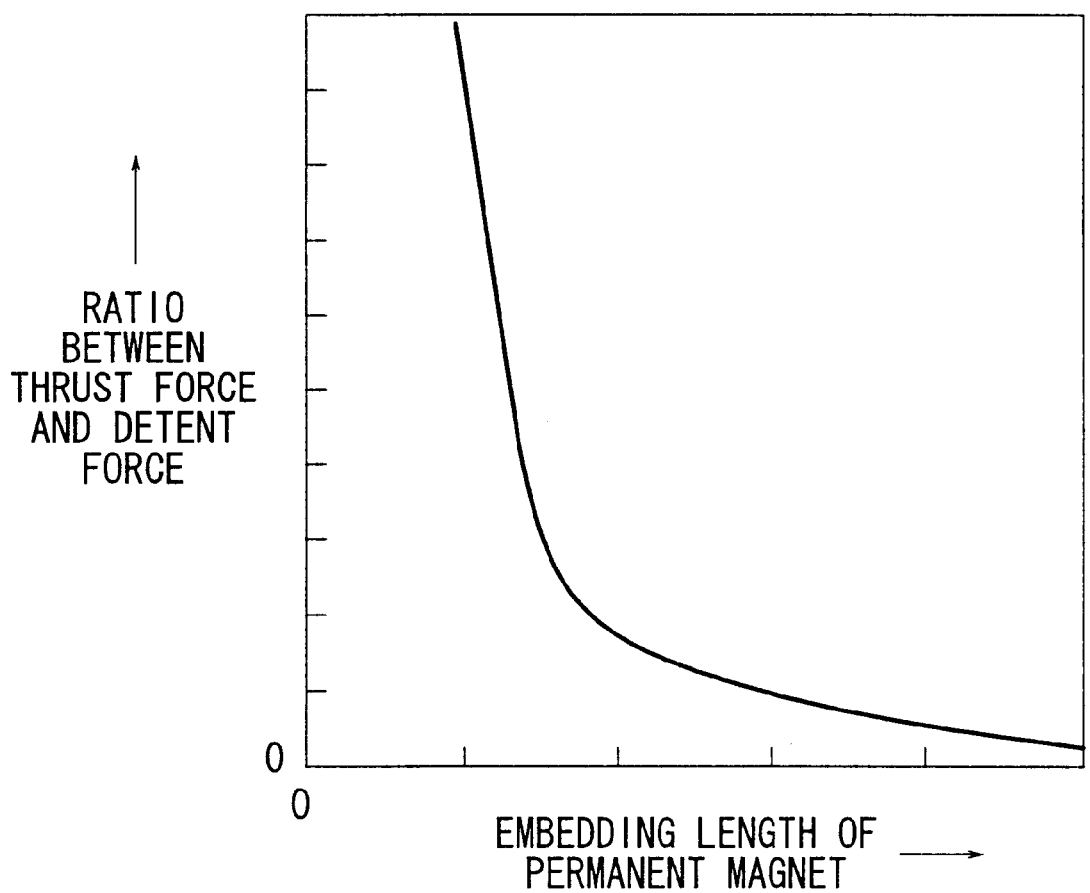
FIG. 18 shows a characteristic illustrating the ratio of thrust force/detent force with respect to the change of the embedding length of the permanent magnet in the linear motor according to the embodiment of the present invention.

The ratio of the thrust force/the detent force, which was obtained when the embedding length of the permanent magnet embedded in the field yoke 1 was changed in the linear motor 10 according to the embodiment of the present invention, was as shown in FIG. 18.

Figure 19:
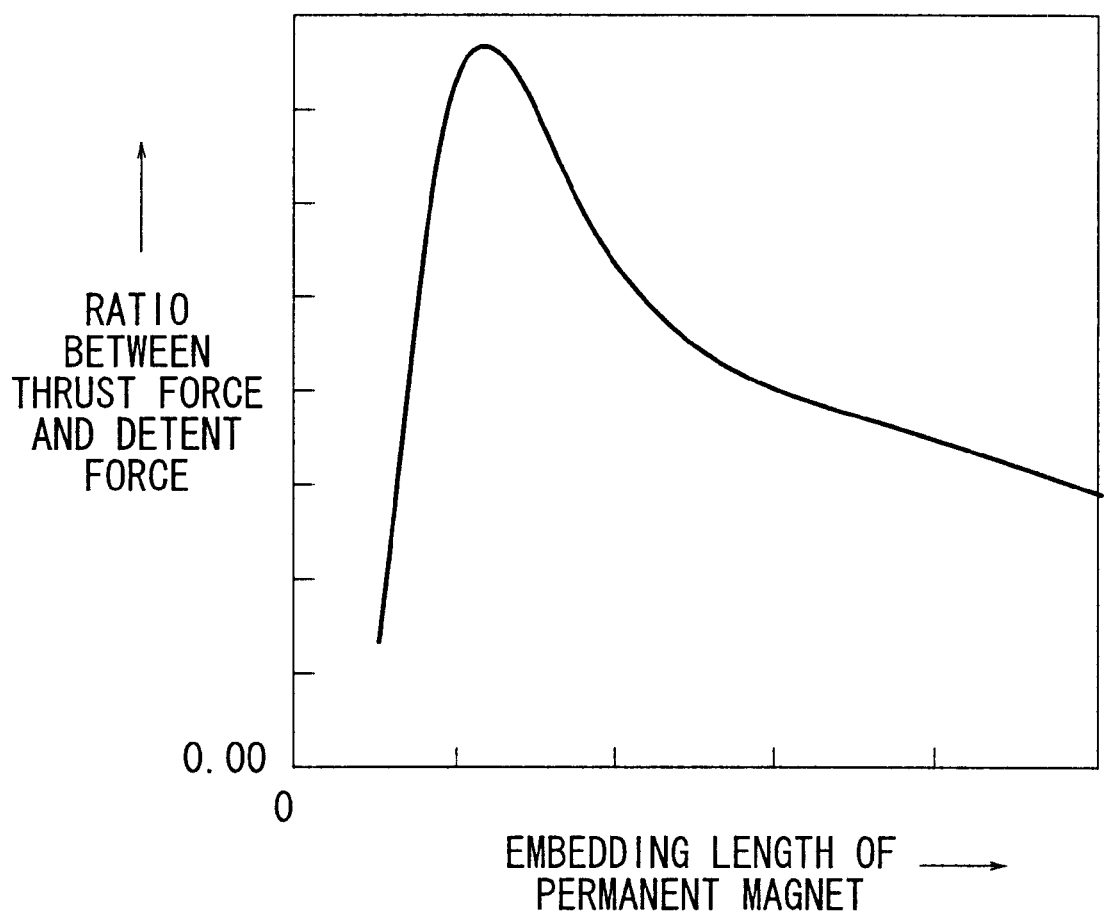
FIG. 19 shows a characteristic illustrating the ratio of thrust force/normal force with respect to the change of the embedding length of the permanent magnet in the linear motor according to the embodiment of the present invention.

The ratio of the thrust force/the normal force, which was obtained when the embedding length of the permanent magnet embedded in the field yoke 1 was changed in the linear motor 10 according to the embodiment of the present invention, was as shown in FIG. 19.

According to the characteristics described above, an appropriate length, which is determined by the relationship concerning, for example, the material for the field yoke 1, the material for the permanent magnet, and the material for the electromagnet core, exists for the embedding length of the permanent magnet embedded in the field yoke 1.

As for the electromagnet core 3-1, 4-1 of the electromagnet 3, 4 of the linear motor 10 according to the embodiment of the present invention described above, FIGS. 2A to 3B and FIGS. 8A to 10B are illustrative of the case in which the cross section is U-shaped. However, in place of the electromagnet core 3-1 (4-1), an electromagnet core 3-5 (4-5) may have an E-shaped cross section, i.e., the electromagnet core 3-5 (4-5) may have three legs with a coil 3-2 (4-2) wound around the central leg 3-6 (4-6).

Illustrative arrangements are shown in FIGS. 20A to 22 together with parts of the permanent magnets.

Figure 20A:
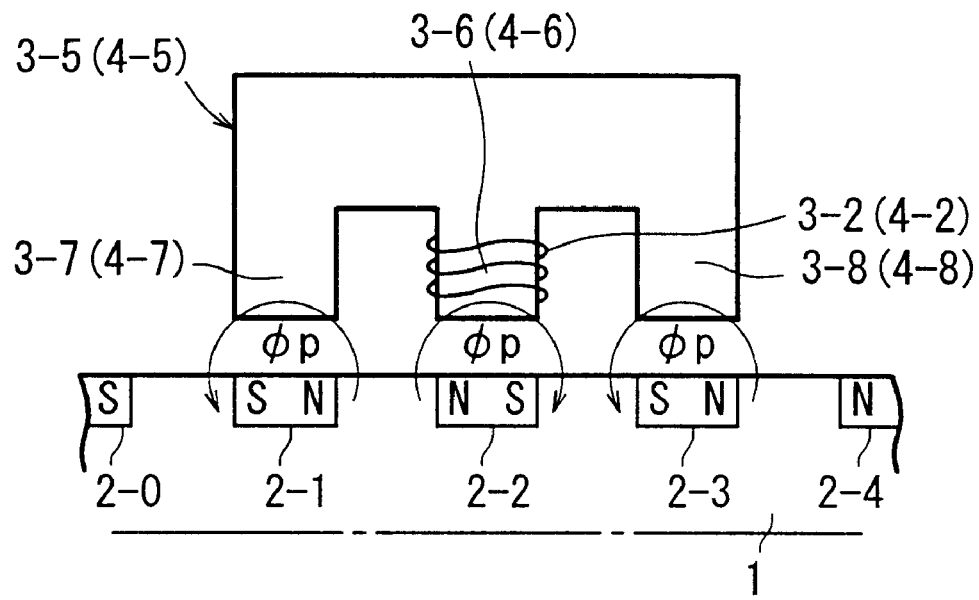
FIG. 20A shows an arrangement of an electromagnet using an electromagnet core having an E-shaped cross section in a linear motor according to an embodiment of the present invention to illustrate a state in which no electric power is applied to a coil.

FIG. 20A shows a state in which the respective positions of the both outer legs 3-7 (4-7), 3-8 (4-8) and the central leg 3-6 (4-6) of the electromagnet core 3-5 (4-5) are approximately opposed to the positions of the permanent magnets, and no electric power is applied to the coil 3-2 (4-2).

Figure 20B:
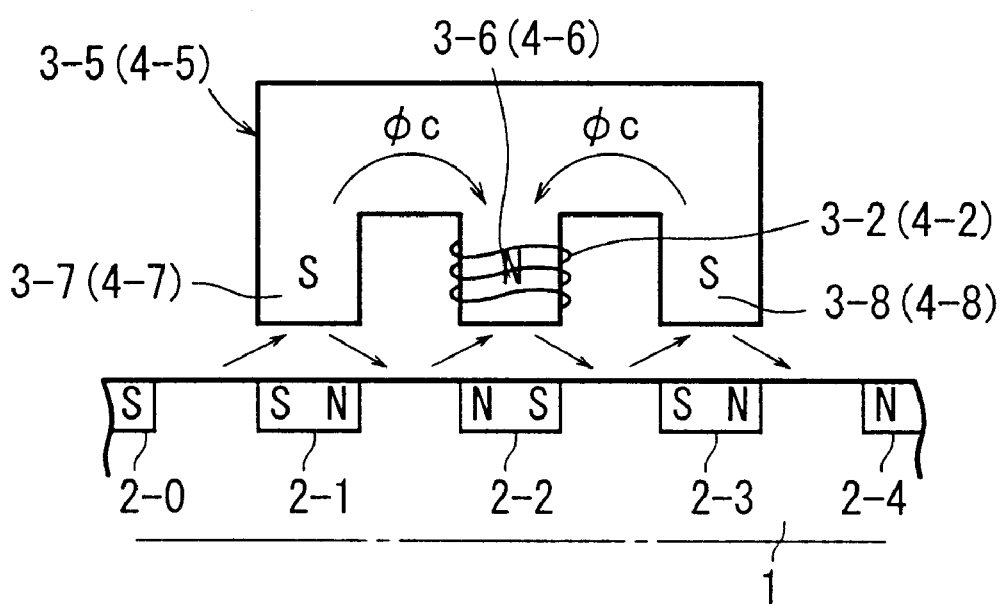
FIG. 20B shows a state in which electric power is applied to the coil.

FIG. 20B shows a state in which the electric power is applied to the coil 3-2 (4-2) in the arrangement shown in FIG. 20A. The S magnetic poles are generated on the both outer legs 3-7 (4-7), 3-8 (4-8) of the electromagnet core 3-5 (4-5), and the N magnetic pole is generated on the central leg 3-6 (4-6) by the magnetization brought about by the electric power application. The attraction and the repulsion indicated by the arrows are generated between the legs and the field yoke portions between the permanent magnets.

Figure 21A:
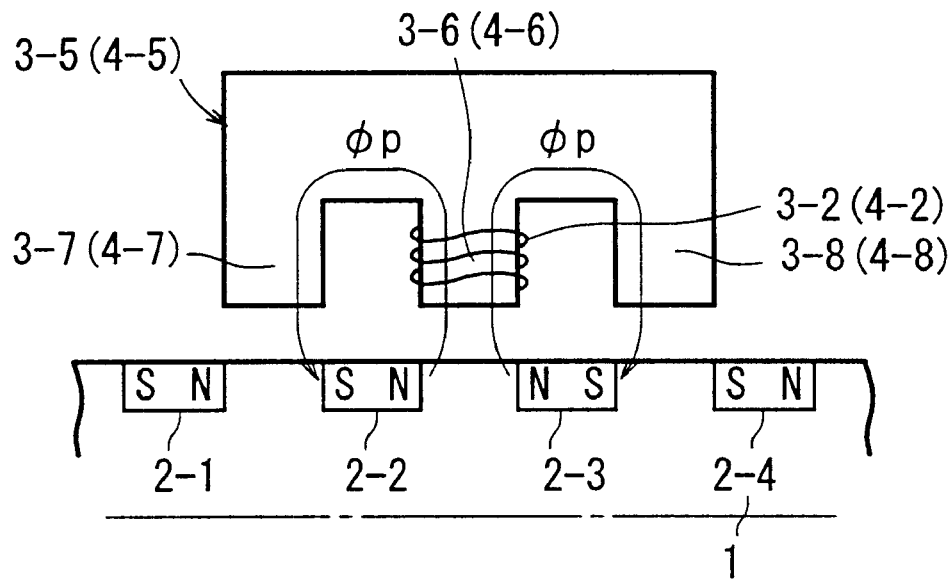
FIG. 21A shows an arrangement of an electromagnet using an electromagnet core having an E-shaped cross section in which the positional relationship between the electromagnet and the field magnet yoke is changed as compared with the arrangement shown in FIG. 20A in a linear motor according to an embodiment of the present invention to illustrate a state in which no electric power is applied to a coil.

FIG. 21A shows a state in which the both outer legs 3-7 (4-7), 3-8 (4-8) and the central leg 3-6 (4-6) of the electromagnet core 3-5 (4-5) are approximately opposed to the field yoke portions between the adjacent permanent magnets respectively, and no electric power is applied to the coil 3-2 (4-2).

Figure 21B:
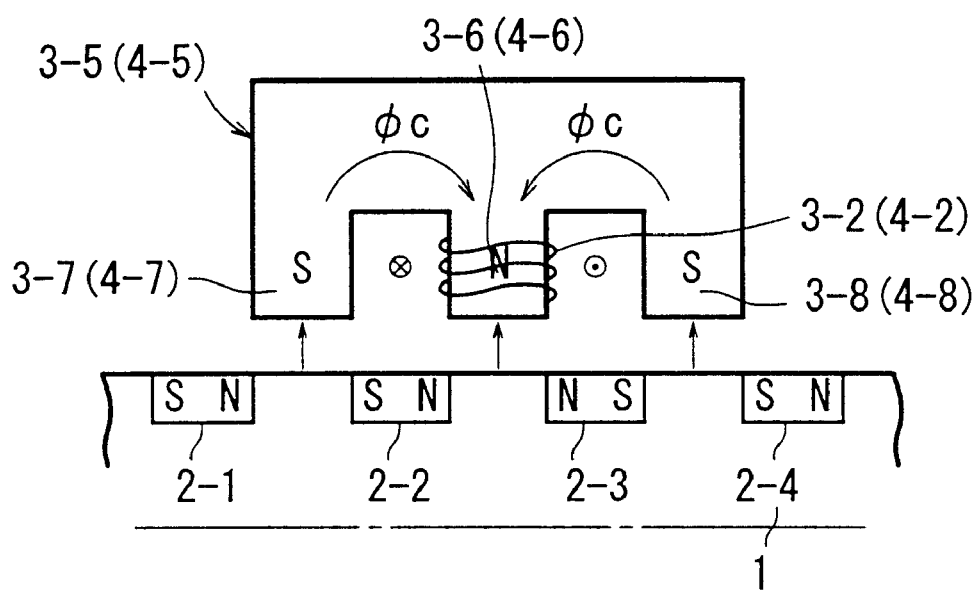
FIG. 21B shows a state in which electric power is applied to the coil.

FIG. 21B shows a state in which the electric power is applied to the coil 3-2 (4-2) in the arrangement shown in FIG. 21A. The S magnetic poles are generated on the both outer legs 3-7 (4-7), 3-8 (4-8) of the electromagnet core 3-5 (4-5), and the N magnetic pole is generated on the central leg 3-6 (4-6) by the magnetization brought about by the electric power application. Only the repulsion indicated by the arrows is generated between the legs and the portions of the field yoke 1 between the permanent magnets.

Figure 22:
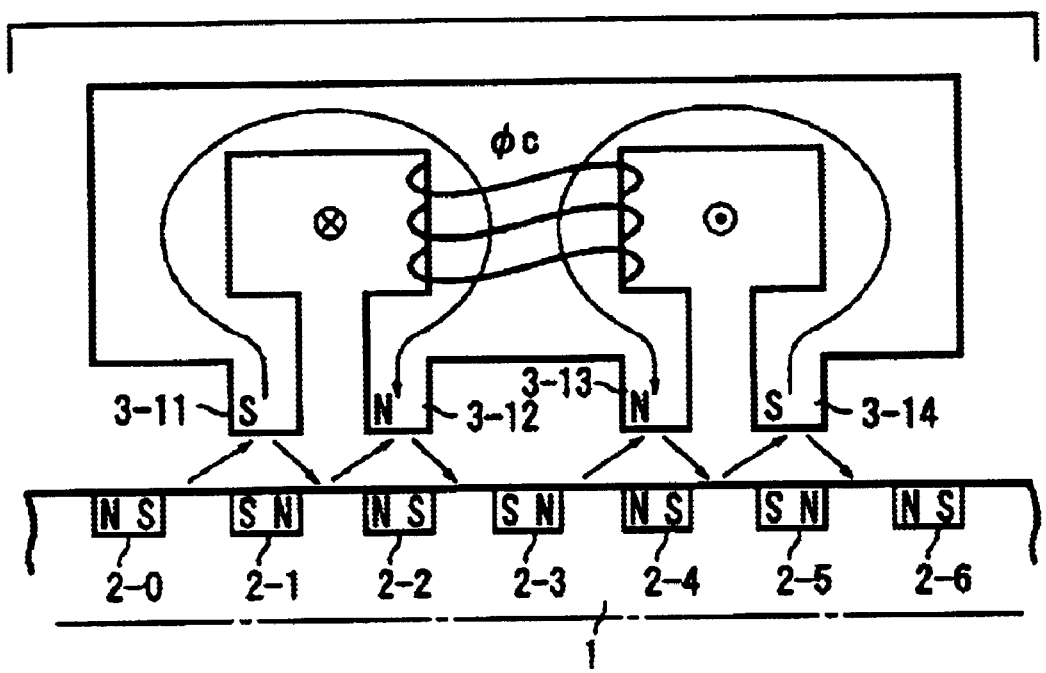
FIG. 22 schematically shows an arrangement of an electromagnet using an illustrative modified electromagnet core having an E-shaped cross section in a linear motor according to an embodiment of the present invention.

FIG. 22 shows an illustrative modified embodiment of the electromagnet core having the E-shaped cross section.

The electromagnet core shown in FIG. 22 is constructed as follows. That is, the electromagnet core shown in FIG. 22 has a pair of legs 3-11, 3-12 and a pair of legs 3-13, 3-14 which are connected to one another by a yoke. The legs 3-11, 3-12 have a magnetic pole pitch which is approximately equal to the pitch of the permanent magnets respectively. The legs 3-13, 3-14 have a magnetic pole pitch which is approximately equal to the pitch of the permanent magnets respectively. The magnetic pole pitch of the legs 3-12, 3-13 resides in the spacing distance which is approximately twice the pitch of the permanent magnets.

When the electromagnet core is constructed as shown in FIG. 22, the attraction and the repulsion are generated between the legs of the electromagnet core and the field yoke 1 when the electric power is applied. A large volume of the coil can be obtained with respect to the magnetic pole pitch. It is possible to obtain large thrust force.

Next, explanation will be made for the three-phase driving.

Figure 23:
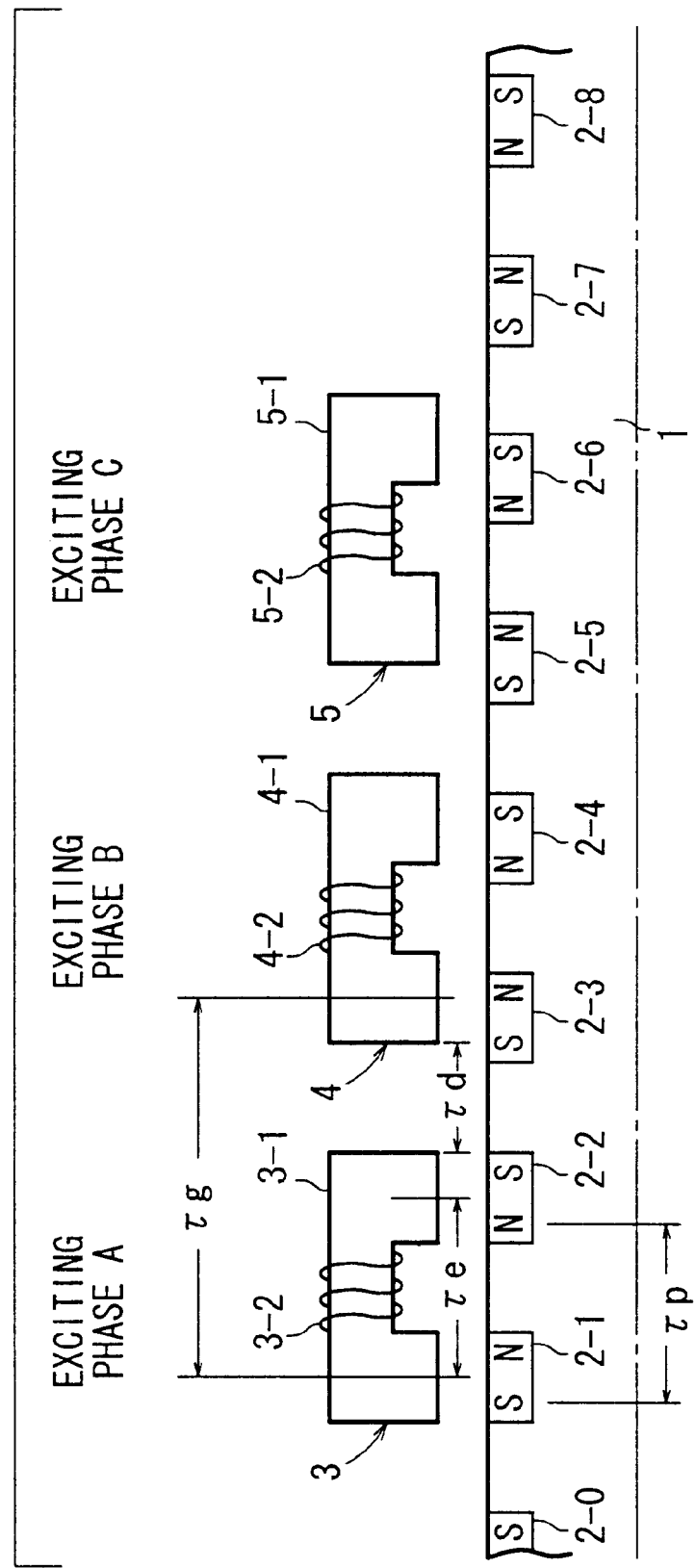
FIG. 23 schematically shows an arrangement adopted when a linear motor according to an embodiment of the present invention is subjected to three-phase driving.

FIG. 23 schematically illustrates an arrangement in which the linear motor 10 according to the embodiment of the present invention corresponds to the three-phase driving.

In this arrangement, the permanent magnets 2-1, 2-2, 2-3, . . . are embedded in the field yoke 1 at the pitch τp in accordance with the expression (1) and the expression (2) described above. The pitch between the electromagnet poles is τe, the pitch between the electromagnets is τg, and the width of the leg of the electromagnet core is τe/2. The three electromagnets 3, 4, 5, which are separated from each other by the spacing distance of τd=5τe/6, are provided to construct the exciting phase A, the exciting phase B, and the exciting phase C by the electromagnets 3, 4, 5 so that the exciting phase A, the exciting phase B, and the exciting phase C are subjected to the three-phase driving.

In FIG. 23, reference numerals 3-1, 4-1, 5-1 indicate the electromagnet cores, and reference numerals 3-2, 4-2, 5-2 indicate the coils.

The function of the three-phase driving is also the same as that of the two-phase driving, in which large thrust force is obtained.

Next, explanation will be made for the five-phase driving.

Figure 24:
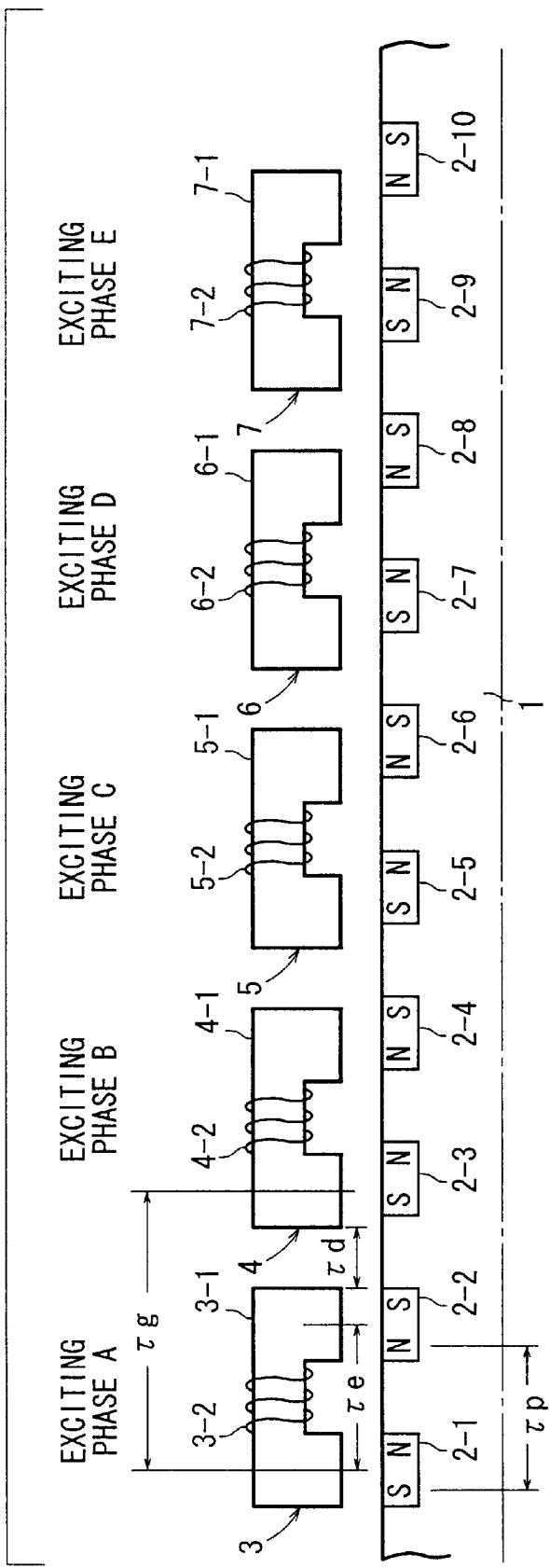
FIG. 24 schematically shows an arrangement adopted when a linear motor according to an embodiment of the present invention is subjected to five-phase driving.

FIG. 24 schematically illustrates an arrangement in which the linear motor 10 according to the embodiment of the present invention corresponds to the five-phase driving.

In this arrangement, the permanent magnets 2-1, 2-2, 2-3, . . . are embedded in the field yoke 1 at the pitch τp in accordance with the expression (1) and the expression (2) described above. The pitch between the electromagnet poles is τe, the pitch between the electromagnets is τg, and the width of the leg of the electromagnet core is τe/2. The five electromagnets 3, 4, 5, 6, 7, which are separated from each other by the spacing distance of τd=7τe/10, are provided to construct the exciting phase A, the exciting phase B, the exciting phase C, the exciting phase D, and the exciting phase E by the electromagnets 3, 4, 5, 6, 7 so that five-phase driving is effected.

In FIG. 24, reference numerals 3-1, 4-1, 5-1, 6-1, 7-1 indicate the electromagnet cores, and reference numerals 3-2, 4-2, 5-2, 6-2, 7-2 indicate the coils.

The function of the five-phase driving is also the same as those of the two-phase driving and the three-phase driving, in which large thrust force is obtained.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A linear motor comprising:

a plurality of permanent magnets which are embedded at predetermined pitches $\tau p$ in a longitudinal direction in a field yoke composed of a magnetic substance; and a plurality of electromagnets which have magnetic pole pitches $\tau e \approx (2n+1)\tau p$, which are provided at pitches $\tau g \approx (2s+/m)\tau e$ in the longitudinal direction of said field yoke, and which are separated from said field yoke by a predetermined gap while opposing to said field yoke, provided that a number of exciting phase or phases is m, n is 0, 1, 2, 3, . . . , and s is 1, 2, 3, . . . , wherein said permanent magnets, which are disposed adjacently to one another, are magnetized in mutually opposite polarity.

2. The linear motor according to claim 1, wherein a core of said electromagnet has two legs which are connected by a yoke for generating magnetic poles having opposite magnetic polarity, and a coil is wound around a yoke portion for connecting said respective legs.

3. The linear motor according to claim 1, wherein a core of said electromagnet has two legs which are connected by a yoke for generating magnetic poles having opposite magnetic polarity, a wire is wound around said respective legs in opposite directions to form a differential coil thereby, and said respective legs are magnetized to have said opposite polarity by applying electric power to said differential coil.

4. The linear motor according to claim 1, wherein a core of said electromagnet has three legs including a coil wound around said central leg, and said legs, which are disposed at both outer positions to intervene said central leg therebetween, are magnetized to have opposite magnetic polarity by applying electric power to said coil.

* * * * *